United States Patent
Hadfield, Sr. et al.

(10) Patent No.: US 6,446,938 B1
(45) Date of Patent: Sep. 10, 2002

(54) KNOCKED-DOWN, RIGID, SHEATHED, GATE FRAME

(75) Inventors: John L. Hadfield, Sr.; Robert H. Calton, both of Lehi, UT (US)

(73) Assignee: Vinyl Industries, Inc., Lehi, UT (US)

( * ) Notice: Subject to any disclaimer, the term of this patent is extended or adjusted under 35 U.S.C. 154(b) by 0 days.

(21) Appl. No.: 09/578,247

(22) Filed: May 24, 2000

Related U.S. Application Data

(60) Provisional application No. 60/135,900, filed on May 26, 1999.

(51) Int. Cl.[7] .................................................. E04H 17/14
(52) U.S. Cl. .......................... 256/65; 256/19; 403/403
(58) Field of Search .............................. 256/73, 19, 24, 256/59, 65, 25; 52/656.2, 656.4, 633, 653.1, 655.1; 403/205, 403, 363, 237; 49/396, 381; 160/236

(56) References Cited

U.S. PATENT DOCUMENTS

| | | | |
|---|---|---|---|
| 2,975,536 A | * 3/1961 | Schindler | ............... 256/24 X |
| 3,395,489 A | 8/1968 | Banse | ...................... 49/381 |
| 4,149,352 A | * 4/1979 | Allen | ............... 403/231 X |
| 4,369,953 A | * 1/1983 | Greiner et al. | ............ 256/24 |
| 4,628,635 A | 12/1986 | Maillard | ................... 49/55 |
| 4,782,637 A | * 11/1988 | Eriksson et al. | ....... 52/653.1 X |
| 4,793,098 A | 12/1988 | Wilkerson | .................. 49/55 |
| 4,796,384 A | 1/1989 | Warwick | .................... 49/55 |
| 4,813,182 A | 3/1989 | Daniels et al. | .............. 49/501 |
| 5,457,914 A | 10/1995 | Johnson, Jr. | .............. 49/463 |
| 5,526,866 A | * 6/1996 | Flentge | .................... 160/380 |
| 5,556,080 A | 9/1996 | Vise | ........................ 256/24 |
| 5,702,090 A | 12/1997 | Edgman | ................... 256/19 |
| 5,716,041 A | 2/1998 | Groves | ..................... 256/73 |
| 5,771,505 A | 6/1998 | Reynolds | ................... 4/559 |
| 5,868,382 A | 2/1999 | Groves | ..................... 256/73 |
| 6,131,886 A | * 10/2000 | Venegas, Jr. | ............. 256/59 |
| 6,131,888 A | * 10/2000 | Brown | ...................... 256/65 |

FOREIGN PATENT DOCUMENTS

FR 2481357 * 10/1981 ................ 256/59

* cited by examiner

Primary Examiner—Lynne H. Browne
Assistant Examiner—John R. Cottingham
(74) Attorney, Agent, or Firm—Pate Pierce & Baird

(57) ABSTRACT

An apparatus for internally framing a vinyl gate suitable for use with vinyl fencing provides completely hidden structures formed of sheet metal and assembled for greater strength and rigidity. Beams may be formed as channels from sheet metal, which may be placed together. with open edges of the channel juxtaposed and positioned within each other, in order to provide fully closed perimeters for beams. Various types of corner ties are provided to support loads and squareness required between vertical and horizontal members of the frame. In various embodiments, vinyl sleeves may be placed over various beams before or after the beams have been fully assembled, as appropriate, possible, or required. In certain embodiments, the entire systems of gate framing may be shipped in a long format appearing primarily as linearly-extending, channel-shaped stock. Likewise sheathing can ship as long stock. All fastening may be done after assembly, in order to finalize squareness and position prior to permanent application of fasteners.

20 Claims, 22 Drawing Sheets

KNOCKED-DOWN, RIGID, SHEATHED, GATE FRAME

RELATED APPLICATIONS

This patent application claims priority under 35 U.S.C. Section 119 to United States Provisional patent application Serial No. 60/135,900 filed on May 26, 1999 and directed to a Vinyl Gate Frame.

BACKGROUND

1. The Field of the Invention

This invention relates to fencing, and more particularly, to novel methods and apparatus for framing sheathed gate structures such as vinyl gates.

2. The Background Art

Gates have existed as long as fences have. Fences have existed substantially as long as the concept of private property has existed. With the advent of new materials and the decorative abilities of plastics, plastic fencing, such as vinyl, and its supporting fencing components have become popular.

Gates have limited ability to suspend from gateposts. Moreover, cantilevered structures need some type of rigid structural support. In addition, vinyl fencing systems do not typically support rigid corners. For example, stresses at corners of gates exceed the loads supportable by vinyl structures.

For many purposes, vinyl fencing is adequately strong, durable, weather resistant, structurally supportive, and the like. However, gates are moving members that are supported from a single side or end. Accordingly, substantial structural integrity is required to a greater degree in a gate than may be required from other fencing components. Moreover, since a gate may be effectively cantilevered, stresses may be substantially higher in portions of a gate, than they would be if merely supporting the weight of a fence structure directly thereabove.

Accordingly, in certain gate systems, a gate itself may be formed of a metal. Alternatively, the gate may be structurally framed of metal, covered with electrostatic powder coating, paint, or sheaths of vinyl material. Metal frames exhibit two serious difficulties, among others. Rigid frames are large, bulky to transport, heavy to handle, and problematic to inventory in a large number of size options.

Attempts to remedy the limitations of solid, prefabricated gates or gate frames, result in welds at corners of steel structures. The welds are subjected to substantial stress from twisting under windloads, slamming, eccentric loading, and various other forces incident to operation of the gate. Thus, assembled, metal, gate frames or gates lack rigidity, or else they tend to fracture at points assigned the responsibility for rigidity.

Gates enjoy another peculiarity. Since gates tend to cover a space or opening having a substantially rectangular aspect, gates are structurally not naturally rigid. That is, any four member structure (quadrilateral) is fundamentally unstable. Making a gate from a plastic serving as structural members is often untenable. Thus, a plastic fence may still require a metal gate.

Torsional rigidity is difficult in a gate, moreover, because a gate structure is typically dominated by two dimensions, a vertical dimension and a horizontal dimension, in which the gate extends. The transverse direction through the gate is typically orders of magnitude less than that of the longitudinal (vertical) or lateral (horizontal) dimension along the expanse of the gate. Accordingly, forces in a transverse direction (through the gate) typically tend to twist one corner about the next two proximate corners. Thus, gate structures often break near the corners thereof due to torsion from loading transversely through the gate against any one of the corners.

In order to obtain maximum strength and stiffness, a tubular member represents a nearly optimal configuration. Rectangular tubular cross sections and circular tubular cross sections provide very stiff structures. Tubular members may be welded and braced to form comparatively strong gates. In order to stabilize the longitudinal and lateral dimensions of a gate structure, a diagonal brace or support may extend from an upper corner (inside) near a hinging mechanism down to an opposite lower corner (outside) that swings as the gate opens. Thus, a comparatively unobtrusive but strong gate support may greatly benefit the rectangular structure.

However, the overall lifetime of a gate structure begins with production of stock materials from which to construct a gate. Many materials are long. That is, one may define an aspect ratio as a relationship of one linear dimension to another linear dimension (typically in a direction orthogonal to the first). An aspect ratio may be thought of as a ratio of the relative aspects of the two dimensions. Gates may have an aspect ratio near unity for their longitudinal and lateral and longitudinal dimensions, but much smaller or greater for others (e.g. transverse: lateral longitudinal: transverse).

When materials are shipped from a source of raw stocks or from a manufacturer of gate hardware to a reseller or customer, total shipping weight is important. Moreover, total shipping volume is important. Shipping costs may increase with excess weight or with excess volume (cubic feet). Thus, a load may "gross out" a hauling vehicle if the weight reaches the maximum vehicle weight permissible. A load may "cube out" a hauling vehicle if the volume of packaging containing goods fills the entire available volume. Ideally, a load grosses out and cubes out a hauling vehicle at about the same point (same number of products). A vehicle grossed out could carry more volume if the volume were not so heavy. A vehicle that is cubed out could haul more weight if the weight did not fill up or require so much volume.

As this applies to gate hardware, maximum structural reliability is required at a minimum weight and minimum shipping volume. Traditionally, gate frames have been manufactured as rigid structures fully assembled. Often, gate frames are welded structures for supporting other gate materials, such as slats, pickets, panels, and the like. As a practical matter, tubular steel may be formed into rectangular structures to serve as gate frames. Whereas other gate materials may be shipped as long stocks, gates become large in two dimensions. Meanwhile, the tubular steels available for welding are often very heavy, comparatively, with respect to other gate materials (especially plastics such as vinyl).

Metallic gates and metallic gate frames have heretofore been extremely heavy. What is needed is a light weight, rigid, metal-reinforced, disassembled gate framing system for vinyl gates.

Likewise, metal-reinforced or metal-framed, gates in vinyl fencing systems are typically open at some point to weather. Some gates are merely painted, others have incomplete shielding by vinyl shrouds and the like. It would be an advance in the art, and a great improvement in the technology to form a metal framing system for vinyl gates in such a way as to use conventional vinyl parts as coverings for the gate framing members. It would also be a substantial improvement in the art to completely enclose the gate members against weather. It would also be an advance in the aesthetics of the art to develop a framing system using metal in rigidizing vinyl gates while completely enclosing metallic components from view and from weathering.

What is needed is a method and apparatus suitable for creating a comparatively rigid, durable frame for operating with vinyl fencing materials to be sheathed with vinyl for weather protection and aesthetics. What is also needed is a system that minimizes the weight of metal, maximizes the stiffness and strength of the frame and of the overall gate, takes a minimum volume to ship, and is comparatively simple to assemble at a destination site.

BRIEF SUMMARY AND OBJECTS OF THE INVENTION

In view of the foregoing, it is a primary object of the present invention to provide a system and method for a "knock-down" gate frame to be sheathed and assembled on site, during installation. In accordance with the invention, a gate framing apparatus and method are disclosed for supporting a plastic or other type of sheathed gate structure.

Consistent with the foregoing objects, and in accordance with the invention as embodied and broadly described herein, an apparatus and method are disclosed, in suitable detail to enable one of ordinary skill in the art to make and use the invention. In certain embodiments an apparatus and method in accordance with the present invention may include lateral beams, vertical beams, and corner ties. These components may all be sheathed with a polymer shell structure for aesthetics and wether protection.

A combination of cutting and braking the sheet metal parts, to form corners and beams having suitable rigidity, light weight, and being readily assembled into a frame. Moreover, due to the structures, and the method for manufacturing and assembling, the metal framing structure may be virtually completely enclosed within conventional vinyl extrusions used for fencing.

A vinyl gate framing system formed of sheet metal with a brake. Beams may be formed as channels. Perforations proximate each end of vertical channels may adapt the vertical channels to receive brackets. The brackets are formed by punching sheet metal to an appropriate shape and braking the blanks formed thereby into right-angled brackets. The right-angled brackets may be passed through the perforation in a backside of a vertical beams to fit between the sides of the channel of the vertical beam thus projecting inwardly to fit inside an end of a lateral channel beam.

Vinyl sleeves, even tubular vinyl sleeves may be slipped over all beams, lateral and vertical, before assembly. In one embodiment, no perforation is required in the vertical beams. Instead, a perforation in a vertical sleeve of a vertical beam is formed. Accordingly, a bracket is inserted into the perforation and thus into the channel of a vertical beam, where fastening such as riveting, bolting, welding, or the like may secure the same.

Meanwhile, an opposite end of the right-angled bracket penetrates through the perforation in the vertical vinyl sleeve to engage an end of a corresponding lateral channel extending away therefrom. Fasteners such as rivets, bolts, screws or the like may pass through the vinyl tubular channel surrounding a lateral beam to penetrate the lateral metal, braked beam and the laterally-extending leg of the right-angled bracket protruding from the vertical beam.

In certain embodiments, a gate frame may be comprised of sheet metal formed into channels and assembled into boxed, tubular structures. The gate corners may be rigidized by ties. Corner Ties, or just ties, may be configured as part of the gate frame members (beams), or as separate entities connecting horizontal and vertical gate frame members to one another. In certain embodiments, the gate frame materials may be formed as channels and remain substantially as channels except at certain highly loaded locations (e.g. corners). In other embodiments, the framing members (horizontal and vertical) may actually be doubled and fastened together in order to provide a box or tube formed by two interleaved channels.

Various methods and apparatus for tying corners of a gate frame are disclosed. In selected embodiments, each half of a tie may be a mirror image of the other half. The major portion of the tie may actually serve as a shear plate for supporting stresses in the corners of the gate. In other embodiments, the ties may be boxed together with channel members in order to provide a dimensionally stable, strong, rigid mechanical structure.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
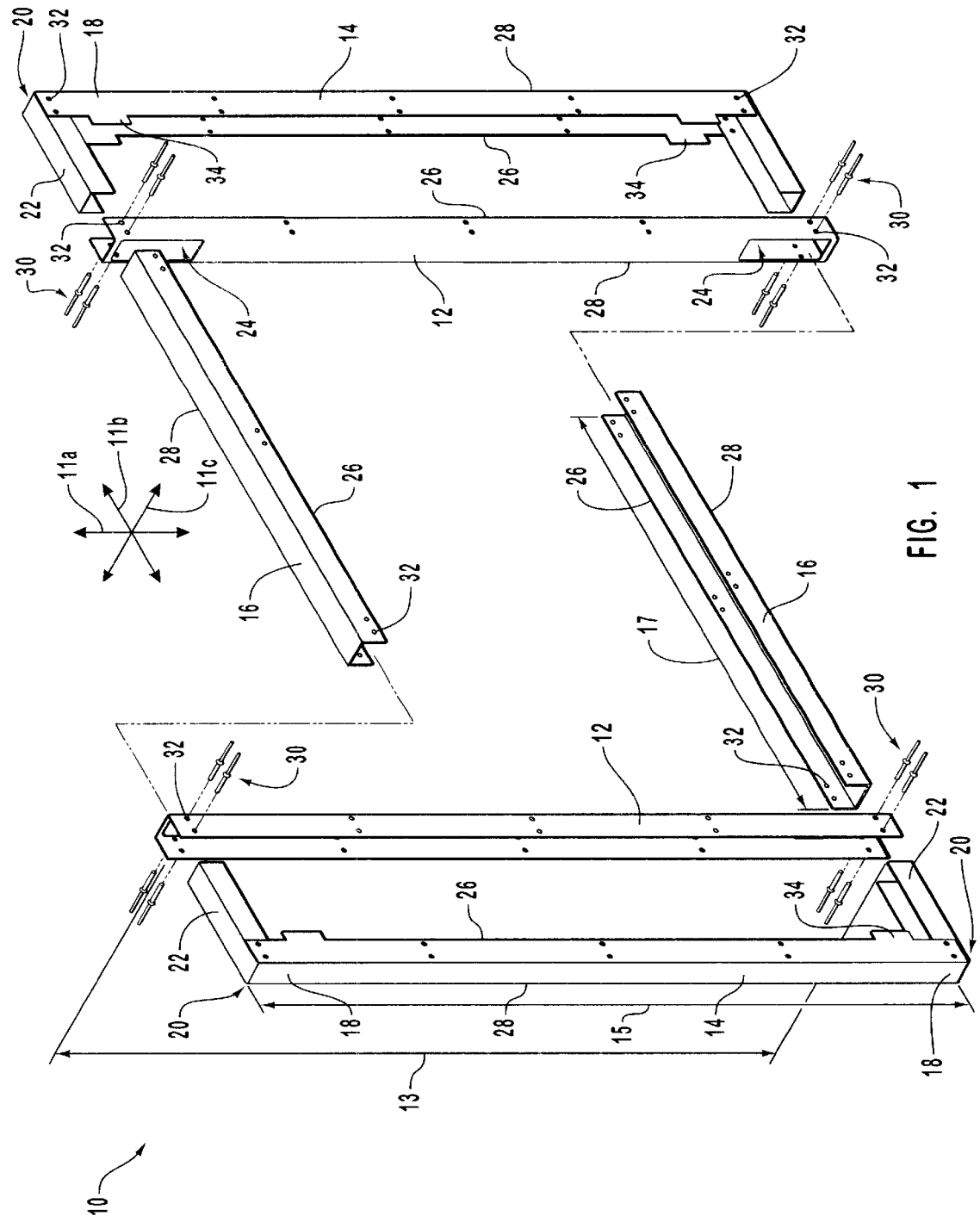
FIG. 1 is an exploded, perspective view of one embodiment of a gate frame structure in accordance with the invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 23, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

Referring to FIGS. 1–4, while referring generally to FIGS. 1–23, an apparatus 10 may be oriented to be described by a longitudinal direction 11a, a lateral direction 11b, and a transverse direction 11c. The apparatus 10 may be made of a plurality of beams 12, 14, 16. For the sake of clarity, the beams 12, 14, 16 may be referred to herein according to their orientations and relative positions, although they may be positioned in any suitable orientation. For example, although upright members 14 may be positioned in a vertical direction, in alternative embodiments, the members having the mechanical characteristics thereof may instead be oriented horizontally. Thus, any reference to upward, downward, sideways, or the like, may be thought of as simply a convenient choice of directions for purposes of this description, and is not limiting of the orientation that a member may take.

An inside upright 12 (beam 12) may form a principal vertical beam 12 for stiffening and otherwise supporting a sheathing member to be disposed therearound. An upright 12 (beam 12) may be matingly fitted by another beam 14 or outside upright 14. Outside may refer to the outboard position of the beam 14 with respect to the beam 12. Nevertheless, the beam 14 may actually be sized to fit within the envelope of the beam 12 in certain embodiments. The upright 12 may have a length 13, and the upright 14 may have a length 15. Assembled together, the uprights 12, 14 form a beam assembly 25 or beam 25 providing substantial rigidity and strength.

Between the beams 25, may extend a cross beam 16 having a length 17. The cross beam 16 may be secured to each beam assembly 25 by a down leg 18 having a length 19, which forms a portion of a tie 20 or corner tie 20. Each tie 20 includes a down leg 18 for securing to the beam assembly 25 and a cross leg 22 for securing to a cross beam 16. In general, a tie 20 may secure a beam assembly 25 to a cross beam 16, but may otherwise be unrestricted as to form. For example, the tie 20 may be formed as part of the cross beam 16. Alternatively, the tie 20 may be formed as part of the beam 14. However, in the embodiment of FIG. 1, the fit of the beam 14 is within the beam 12. The cross leg 22 of the tie 20 extends from an integral attachment to the beam 14 through the beam 12 to receive the beam 16 thereon. The beam assembly 25 has been boxed and reinforced to become a particularly rigid structure.

To the end of structural integrity and stiffness, as well as superior strength, the aperture 24 may be an enclosed aperture 24. Alternatively, the aperture 24 may be open on one side (see FIGS. 2–4).

In general, each beam 12, 14, 16 may typically be formed as an open channel. To that extent, the beams 12, 14, 16 may have edges 26, with vertices 28 defined by each bend 28. That is, in certain presently preferred embodiments, each of the beam members 12, 14, 16 may be formed of a sheet metal strip, using a bending brake. Thus, material properties and thicknesses, along with distances between edges 26 and vertices 28, and between various vertices 28 may establish the comparative strength, stiffness, and so forth of each beam 12, 14, 16.

The beams 12, 14 may be secured together by fasteners 30. Likewise, the cross beams 16 may be secured to the beam assemblies 25 by fasteners 30. In certain embodiments, the members (e.g. down leg 18, cross leg 22) may be secured together by fasteners 30 in the process of securing the beams 12, 14 together as a boxed, tubular structure.

Perforations 32 may be sized, along with the diameters and lengths of the fasteners 30 to provide securement of multiple layers of sheet metal. For example, in the assembly of the beams 12, 14, along with securement of the cross leg 22 of the tie 20, the perforations 32 may extend through three or more layers of sheet metal.

In certain embodiments, a registration tab 34, alternatively referred to as a tab 34 or a register 34, may extend from an edge 26 of a beam 14 in order to protrude through the beam 12, to ultimately orient a suitable piece of plastic sheathing in order to complete a section of a gate structure for a fence.

The registers 34 or tabs 34 are optional. However, in certain embodiments, the registers 34 have been useful for orienting sections of polymeric sheathing supported by cross beams 16. Thus, the registers 34 may provide alignment in a longitudinal direction 11a, and a transverse direction 11c.

In certain embodiments, (e.g. see FIG. 1) the apertures 24 may be completely "closed," meaning that the entire perimeter of the aperture 24 is defined by continuous material. Accordingly, a connection 39a between opposing sides 39b, 39c of a beam 12, may provide additional strength and rigidity. By contrast, leaving the aperture 24 not closed (see e.g. FIG. 2–4, perimeter is discontinuous), may rely more on the comparative strength and stiffness of the beam 14 and cross leg 22.

The ties 20 may be made as part of single pieces for each beam assembly 25. Thus, the beam 14, may actually terminate at each end with a portion 22 to serve as a cross leg 22. The cross leg 22 can simply be folded over at a corner vertex 37 to form a permanently attached cross leg 22. In this case, the beam 14 itself may serve as the down leg 18. Alternatively, the beam 14 may be reduced to a shorter stiffener 14 near a midrange position of the beam 12 (see, e.g. FIGS. 4, 11). In such an event, a down leg 18 may be short, on the order of the size of the cross leg 22.

Figure 2:
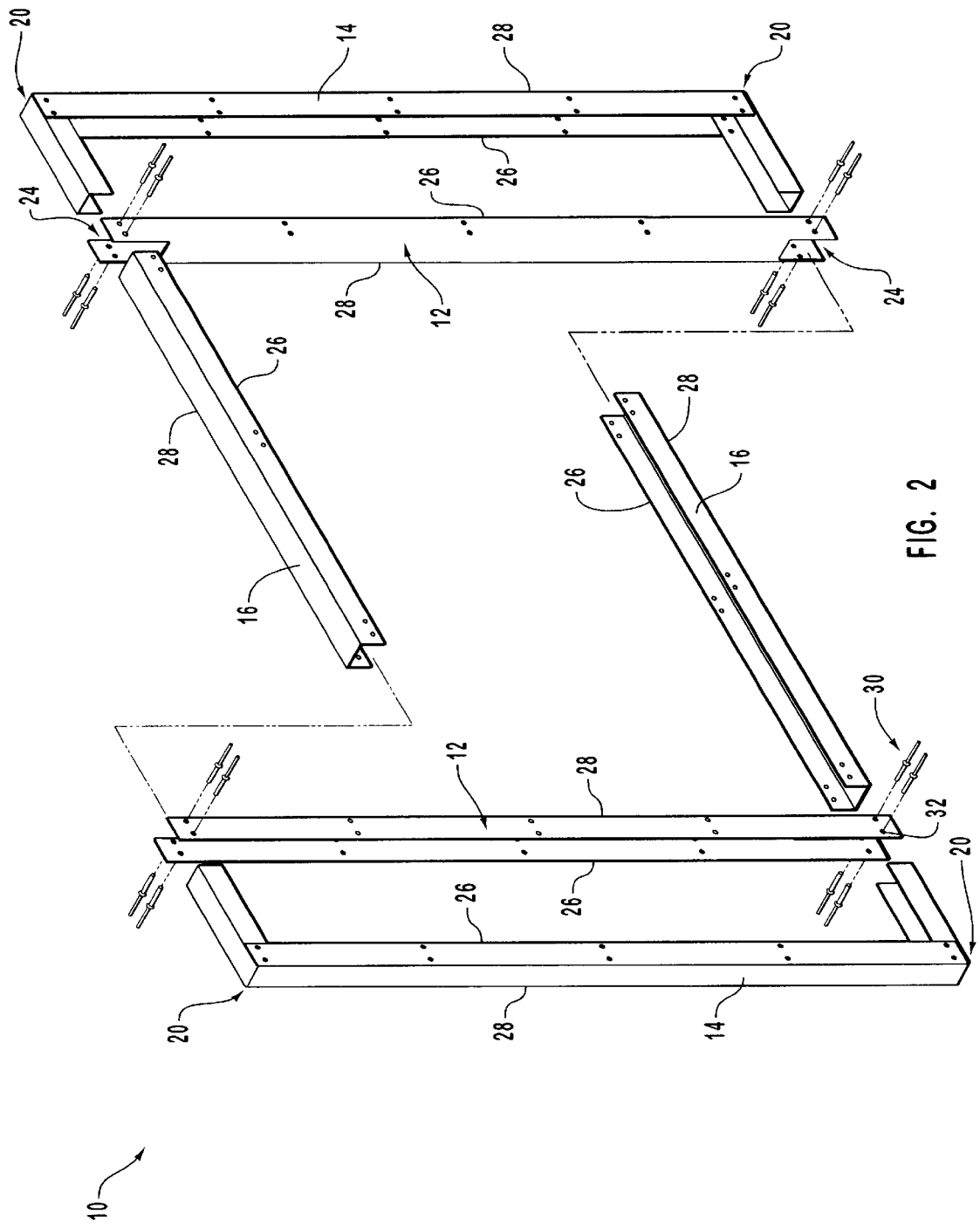
FIG. 2 is an exploded, perspective view of an alternative embodiment of a gate frame structure in accordance with the invention.
Figure 3:
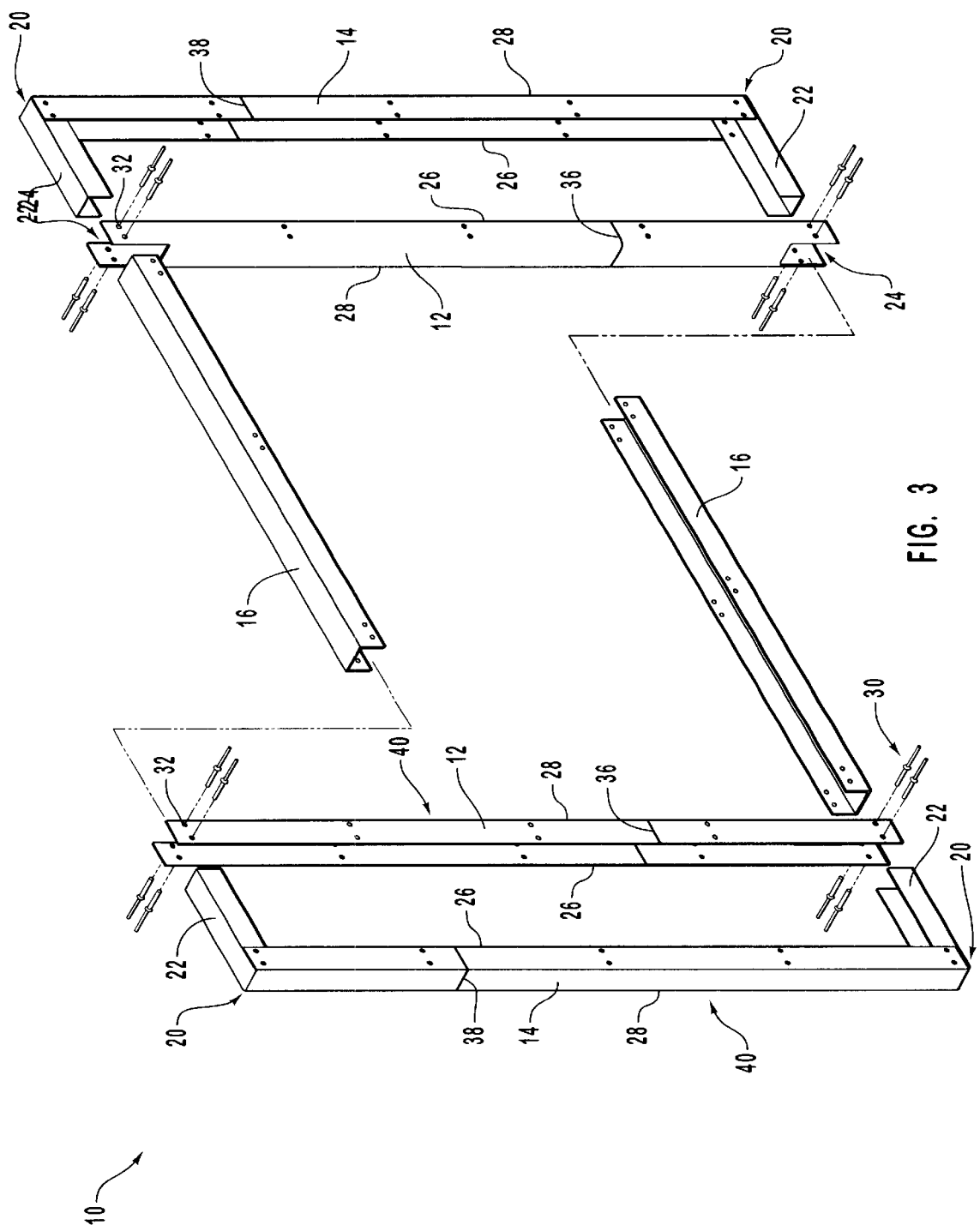
FIG. 3 is an exploded, perspective view of an alternative embodiment of a spliced gate frame structure in accordance with the invention.

Referring to FIGS. 2–3, while continuing to refer generally to FIGS. 1–4, and globally to FIGS. 1–23, a frame 12 may provide an aperture 24 designed to fit a cross leg 22 of a tie 20. The beams 14 may fit inside the beams 12, in order to provide a closed cross section (tubular shape) closed on all four sides of a perimeter. In the embodiment of FIG. 3, each of the beams 12, 14 may actually be formed to have a cut 36, 38, respectively that is made at the time of installation, or before, such as at the time of manufacture. Accordingly, by offsetting the cuts 36, 38 from one another, great adjustability in the lengths 13, 15 can be made by cutting any excess material from either the beam 12 or the beam 14, as needed.

The beams 12, 14 may be manufactured in standard lengths. However, by using a splicing technique with the beams 12, 14, substantially any beam assembly 25 may be of a length 13, 15 desired, up to a maximum length of manufacture. The resulting assembly 25 may be made sufficiently rigid, strong, and supportive, yet can be manufactured as two straight channels. That is, each of the cross legs 22 may be formed by making a suitable cut in the beam 14. Thus, the folding of the cross leg 22 (about corner vertex 56; see, e.g. FIG. 6) at the time of installation, creates the tie 20.

Figure 4:
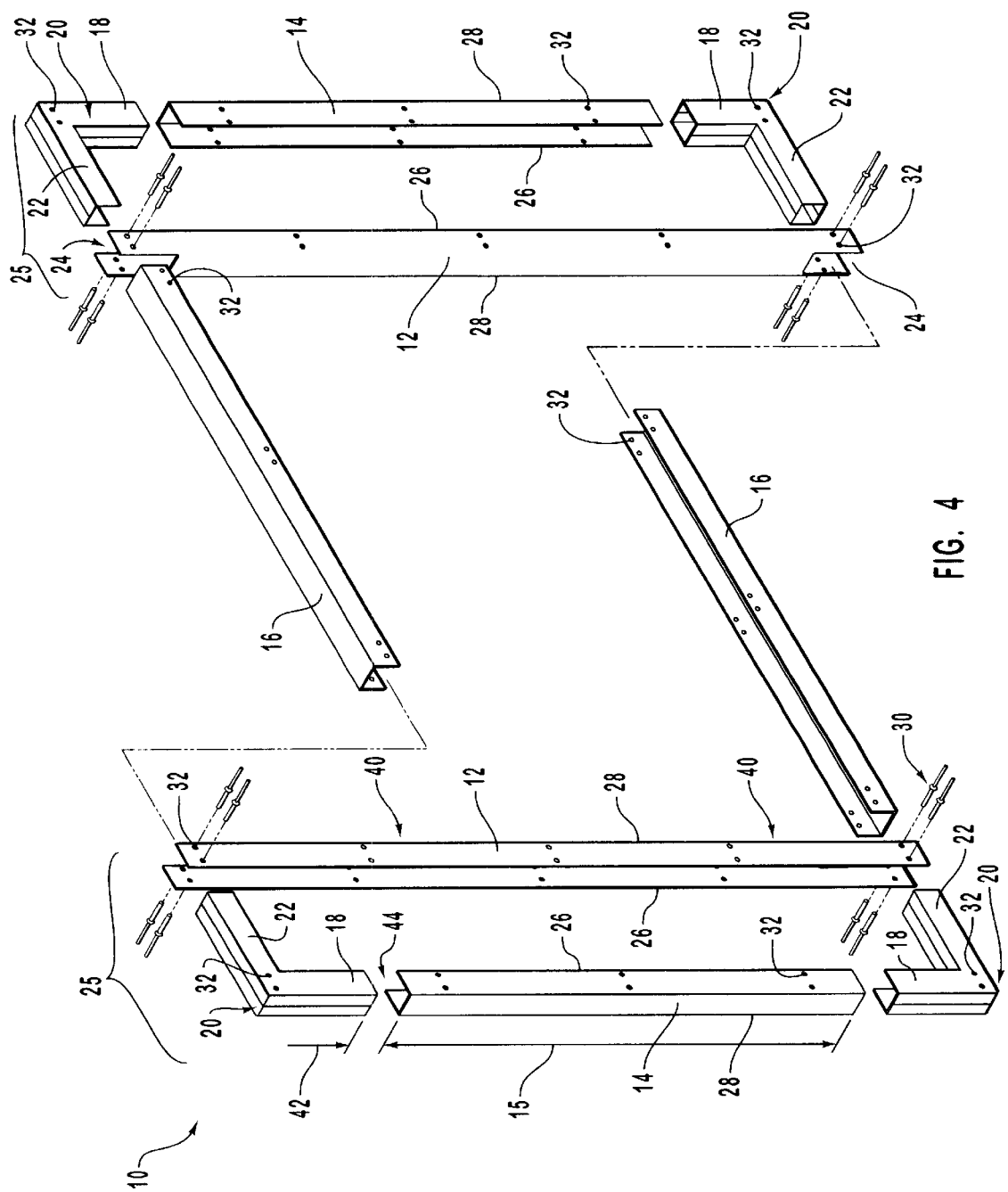
FIG. 4 is an exploded, perspective view of an alternative embodiment of a gate frame structure relying on split, plainer-rigid tie structures.

Referring to FIG. 4, while continuing to refer generally to FIGS. 1–23, a frame assembly 10 or apparatus 10, may include a beam 14 of limited length. In certain embodiments, the tie 20 may fit inside the beam 14, which fits inside the beam 12. In an alternative embodiment, the beam 14 may actually form not only itself, but the down legs 18 of the ties 20. In the embodiment of FIG. 4, the beam 14 may be sized of corresponding dimensions with respect to the ties 20 in order to fit snugly within the beam 12. Thus, a joint region 40 may be formed in the overall beam assembly 25. The beam 14 may abut the down legs 18 of the ties 20, in selected embodiments. Alternatively, the length 15 of the beam 14 may be reduced to a size that becomes merely a spacer 14 or brace 14 to resist buckling failure in the beam 12.

In alternative embodiments, a distance 42 between the beam 14 and the down legs 18 may establish a gap 44 of any suitable size. Again, designing around a variety or gaps 44 may provide for various sizes of beams 12 to be matched to standard sizes of ties 20 and some limited number of sizes (maybe even only one size) of beams 14.

Figure 5:
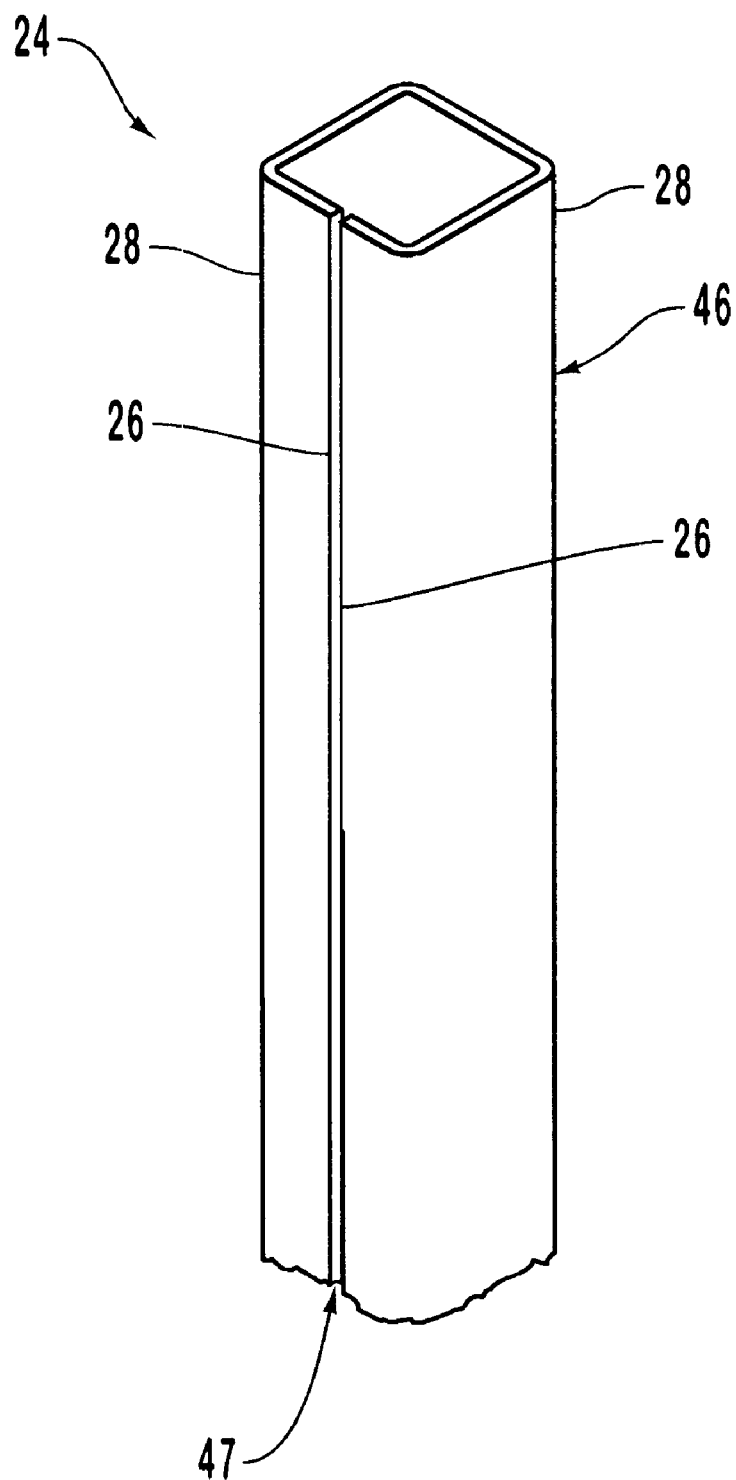
FIG. 5 is a partial, cutaway, perspective view of an alternative embodiment for the structural beams for the apparatus of FIGS. 1–4.

Beams 12, 14, 16 may be formed in a variety of cross sections. A simple brake may be used to form a channel such as those illustrated in the beams 12, 14, 16 of FIGS. 1–4. Alternatively, in order to provide additional stiffness, each or every one of the beams 12, 14, 16 may be formed in a more nearly closed cross section. For example, the embodiment of FIG. 5 illustrates that a beam 46 may be formed to have the edges 26 close together, juxtaposed across a gap 47. The gap 47 may provide the beam 46 with four vertices 28 or bend areas 28. Thus, each of the vertices 28 of the cross section of the beam 46 may engage a respective shape from a beam 12, 14, 16, or a tie 20.

If fasteners 30 may be used on any or all sides of a beam 46, then the benefits of a fully closed cross section may be approached by an assembly 25 including beam shapes like that of the beam 46 of FIG. 5. With the corner tie 20 illustrated in FIGS. 2–4, the beam 46 may actually be closed completely to be a fully tubular beam. Thus, if the gap 47 is deemed to represent a weld region 47, instead, then the beam 46 is a fully closed, tubular beam 46 having exceptional rigidity. That rigidity may be largely maintained by using the tie design of FIGS. 2–4.

Figure 6:
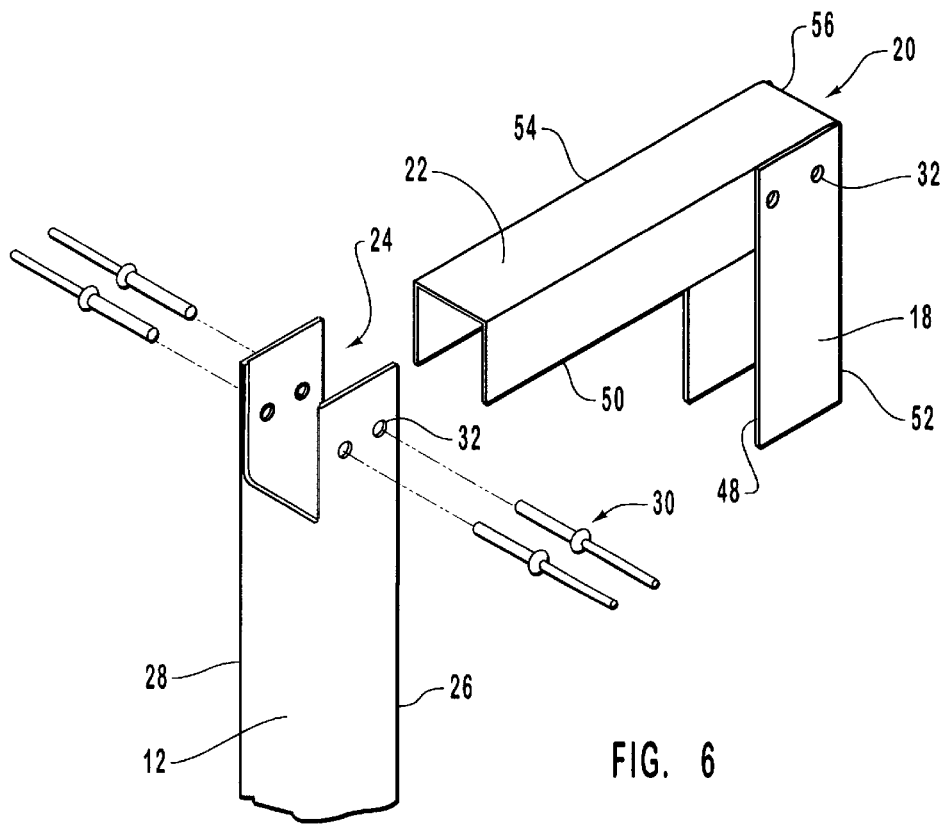
FIG. 6 is a perspective view of a folded-corner type of tie for the gate structures of FIGS. 1–4.

Referring to FIGS. 6–10, while continuing to refer generally to FIG. 1–23, a tie 20 may be formed by braking sheet metal to form edges 48, 50. Actually, the edges 48, 50 may be a single edge in one embodiment, if the cut to bend the tie 20 is made after the original vertices 52, 54 are formed. However, in another embodiment, a slot or slice may be punched in a flat piece of sheet metal, which then may be placed in a brake or die for forming the vertices 52, 54. In the embodiment of FIG. 6, the aperture 24 in the beam 12 is not fully closed (open perimeter). Instead, the fasteners 30 must secure the beam 12 to the down leg 18 and the cross leg 22 through mutual engagement of all the apertures 32 therethrough.

Figure 7A:
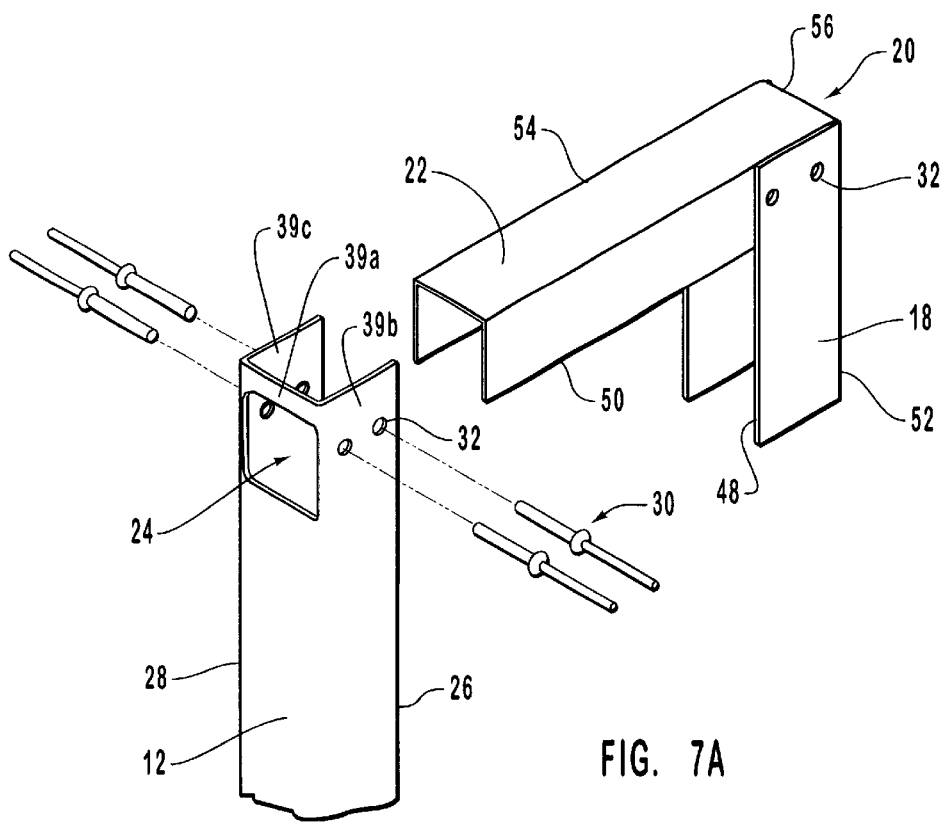
FIG. 7A is a perspective view of an alternative embodiment of a folded-corner type of tie.
Figure 7B:
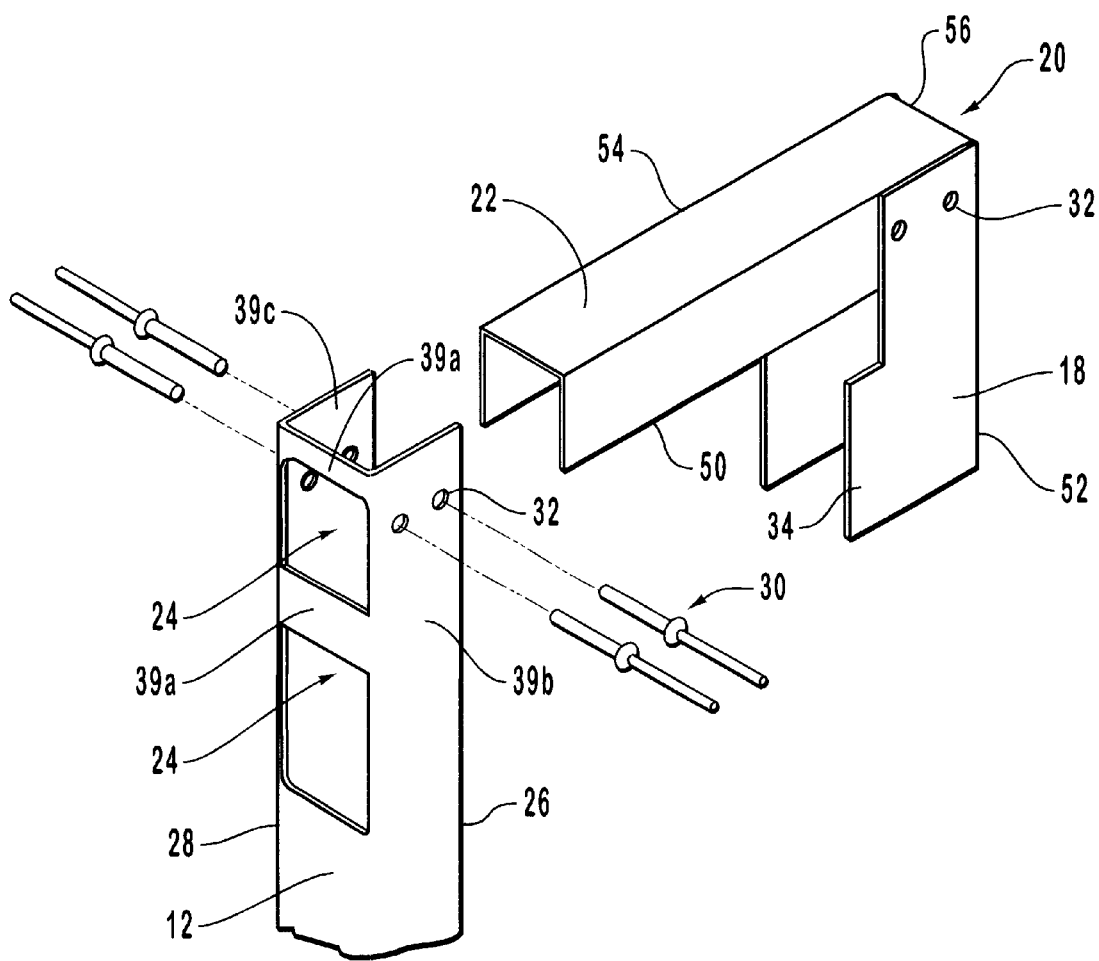
FIG. 7B is an alternative embodiment of a folded-corner type of tie having registers for rigidizing vinyl fencing members.

By contrast, the beam 12 of FIG. 7A provides a connector 39a or connection 39a between the sides 39b, 39c. Thus, the aperture 24 of FIG. 7A is a closed aperture with its entire perimeter closed. Referring to FIG. 7B, the tabs 34 or registers 34 may be provided with a second aperture 24 in order to provide additional connections 39a between the sides 39b, 39c of the beam 12. Additional strength and stiffness of the tie 20 and the beam 12 will result. Likewise, additional registration and retention of an end of any sleeve or sheathing piece fitting over the cross leg 22 may engage the tab 34 or register 34 to be mechanically stabilized longitudinally 11a or transversely 11c.

One may note that the vertex 56 is bent to position the cross leg 22 in a substantially orthogonal position with respect to the down leg 18. The structural integrity at the vertex 56 may provide much of the value of a tie 20, by tying the vertical uprights 12, 14 into the cross beam 16 through the tie 20. Since the vertex 56 represents a bend, the cross leg 22 and down leg 18 also interface with one another through the fasteners 30. Likewise, certain compressive forces may be supported by the tight fit between the cross leg 22 and the down leg 18 in several directions. However, a principal tensile member supporting tensile loads, may be the vertex 56. The fasteners 30 support the cross leg 22 and down leg 18 against relative motion by supporting a shear load.

Figure 8:
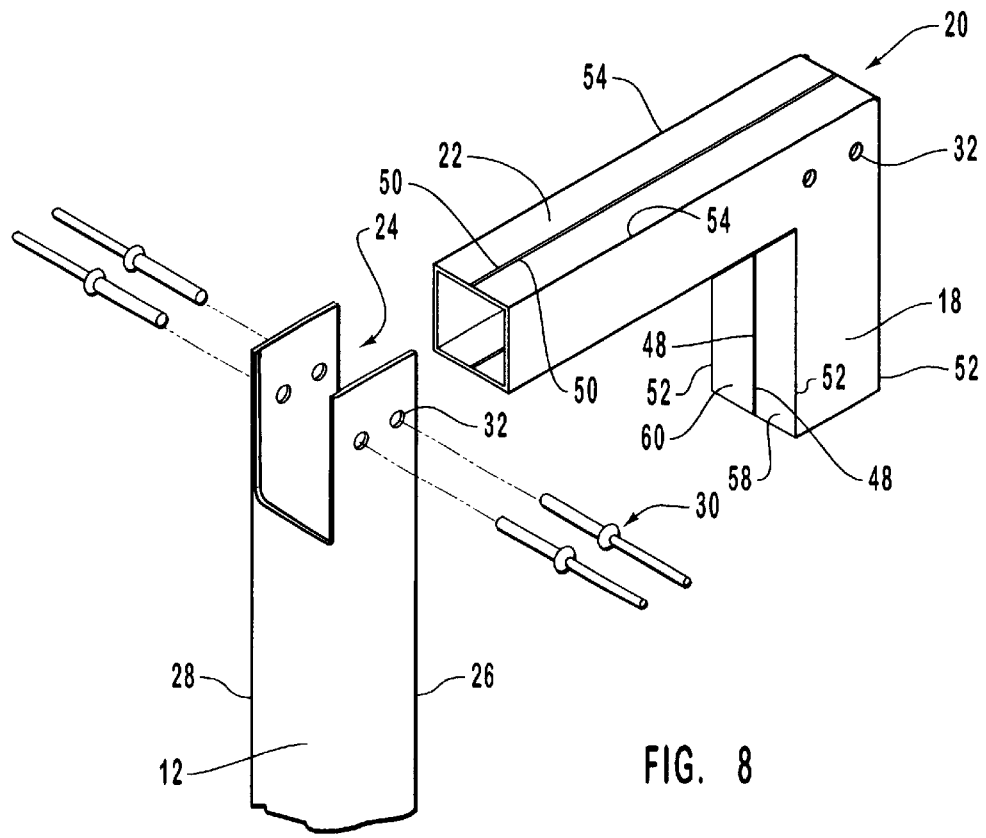
FIG. 8 is a perspective view of a split, planar-rigid type of corner tie for use in the gate frames of FIGS. 1–4.
Figure 9:
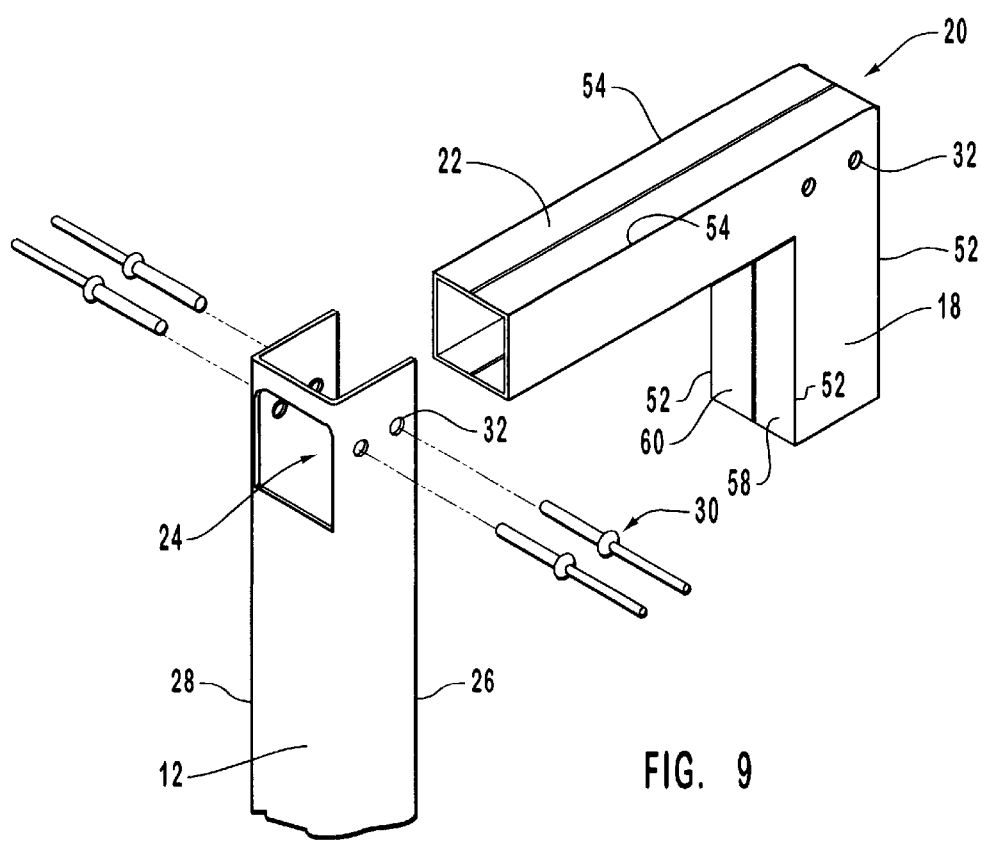
FIG. 9 is a perspective view of the corner tie of FIG. 8 used by fitting within an enclosed-aperture in a structural beam.

Referring to FIGS. 8–9, while continuing to refer to FIGS. 1–23, a tie 20 may be constructed using mated halves 58, 60. The halves 58, 60 need not be secured to one another before assembly with the respective means 12, 14, 16. Vertices 52 of the down leg 18 and vertices 54 of the cross leg 22 may be formed by stamping or braking the halves 58, 60 from flat blanks of sheet metal.

The edges 48, 50 may be included together in an abutting relationship, aligned and oriented by the beam 12. If a beam 14 is fitted between the beam 12, and the tie 20, then the tie 20 may be aligned and contained within a closed environment. Although the halves 58, 60 may be aligned and registered with respect to one another by the aperture 24, the perimeter of the aperture 24 may be open on one side or closed on all sides as described above.

Figure 10:
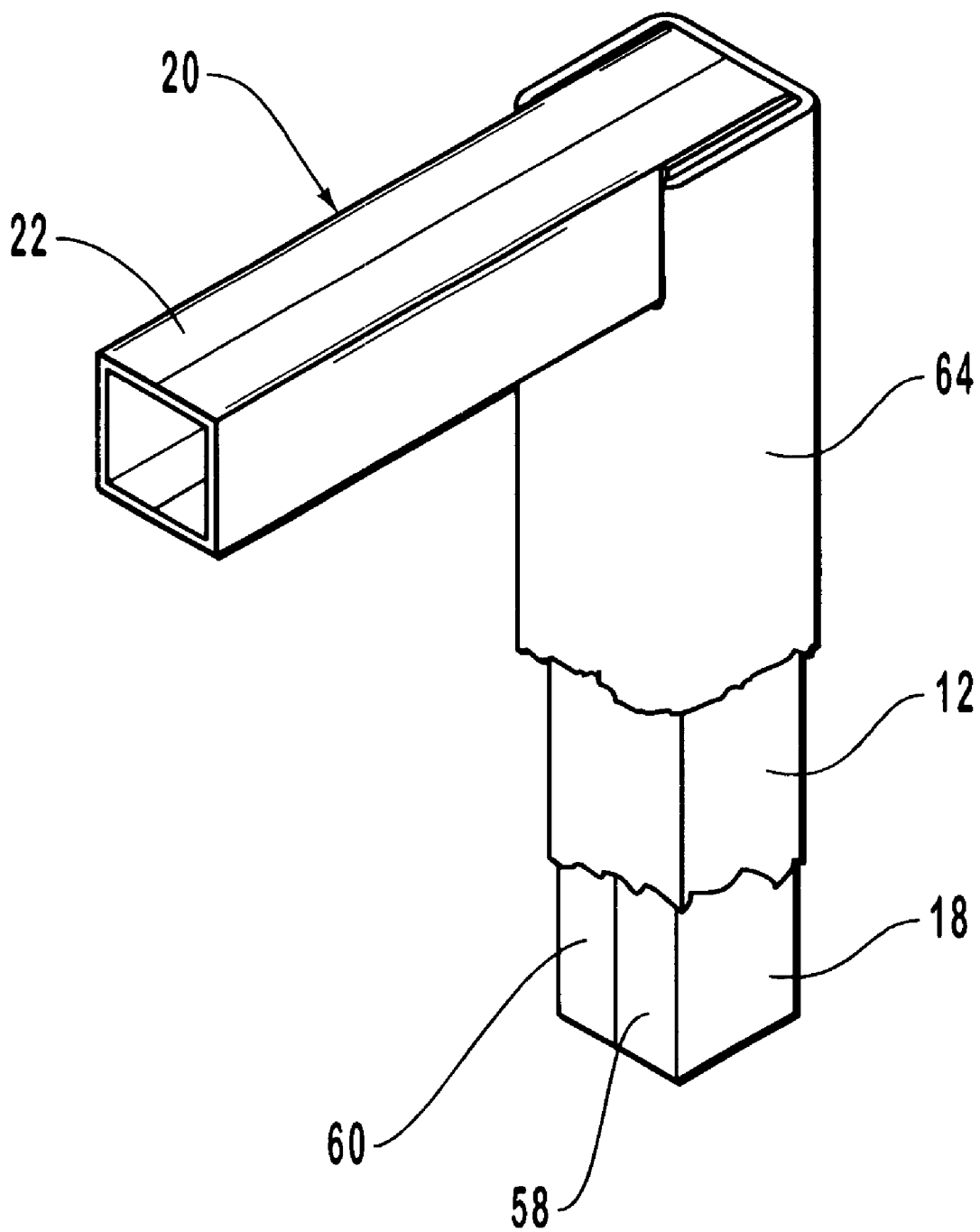
FIG. 10 is a perspective, cutaway view of a tie in accordance with FIG. 9, illustrating the sheath of vinyl surrounding the beam member fitted, with the tie fitted interior thereto.

Referring to FIG. 10, a tie 20 may be fitted to a beam 12 of closed cross section, open (e.g. three-sided) cross section, or an open four-vertex cross section (see FIG. 5). Accordingly, the sheathing 64 may be fitted directly over the beam 12, which can, in turn, be fitted directly over the halves 58, 60, aligning them. Thus, in the embodiment of FIG. 10, the entire beam 12, and sheathing 64 need only be formed of straight pieces of a single cross section. Corners may all be assembled corners as a direct result of fitting the tie 20 to the beams 12, 14.

The sheathing 64 forms a cover. In the embodiment of FIG. 10, the sheathing to cover the cross leg 22 (and the cross beam 16) may be cut to cover just the top of the tie 20 up to the vertical sheathing 64. In an alternative embodiment, the sheathing 64 (e.g. see FIG. 11) over the cross beams 16 may be cut to cover all but one surface (e.g. end of beam 16) of the tie 20, with the vertically oriented sheathing 64 that is placed over the upright beam 14 and cross leg 22 cut to cover that remaining portion of the tie 20.

Referring to FIGS. 11–17, while continuing to refer generally to FIGS. 1–23, an apparatus 10 may include sheathing 64 over the upright beams 12, 14, as well as other sheathing 68 over the cross beams 16. The sheathing 64 may also be referred to as a transom 64, reflecting its orientation and function. In general, a receiver 66 may be secured to the beam 12, for covering a series of slats 68 fitted to the transoms 68.

Figure 11:
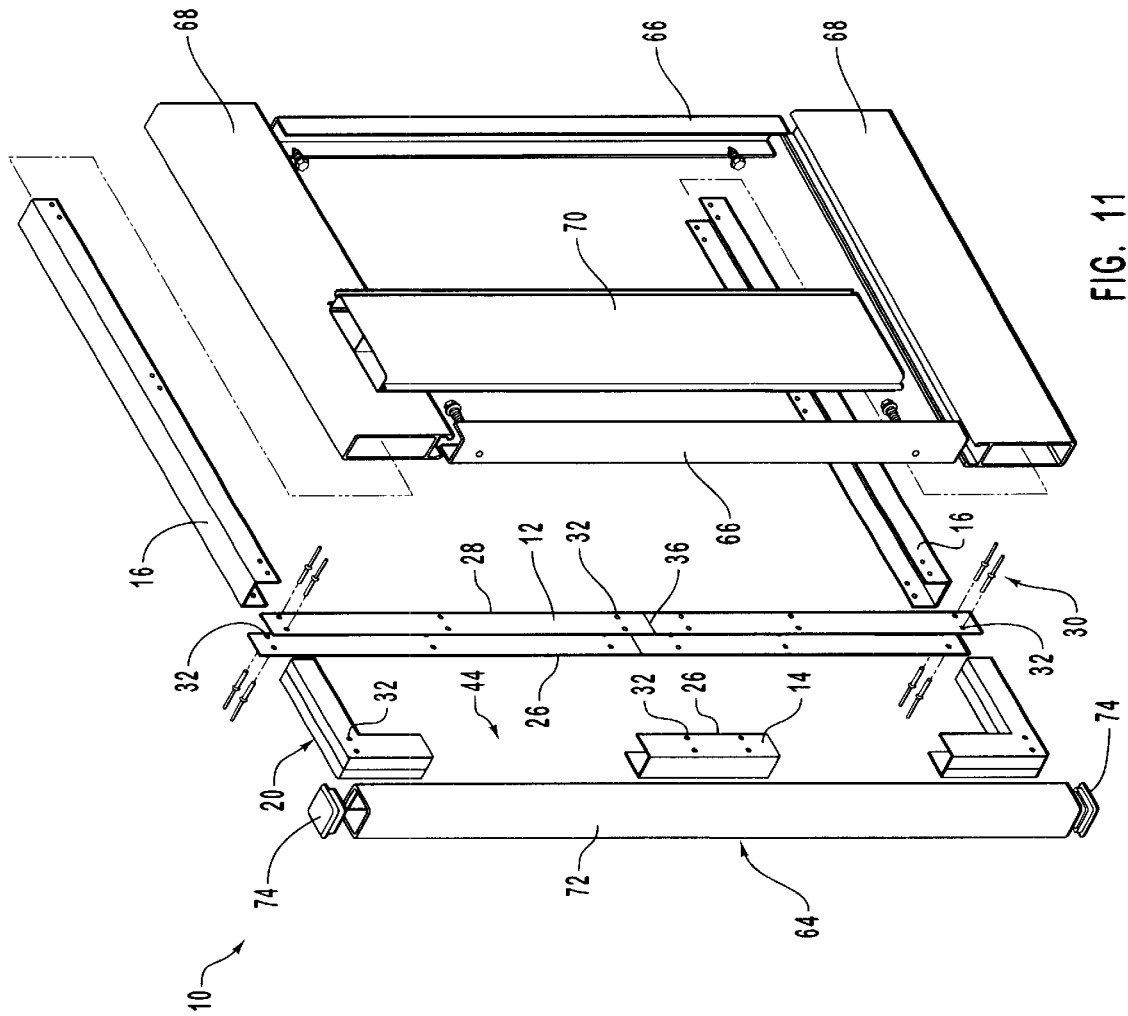
FIG. 11 is an exploded, perspective view of a gate frame structure in accordance with the invention, illustrating a spliced construction with a planar-rigid tie, as assembled with a vinyl transom and slats.

Note that the beam 14 in the embodiment of FIG. 11, illustrates the potential for using a shorter beam 14 simply to perfect a splice at a cut 36 in the beam 12. The beam 14 illustrated in FIG. 11 is simply one embodiment, of which any of the previously discussed embodiments may be an alternative in the illustrated structure.

Although many of the plastic parts that may be used in fencing (and thus gates) are sheathing 64, including the transoms 68, and the sleeves 72, others 66, 70 are either decorative or form structural support for the decorative functions. One benefit of the apparatus 10 in accordance with the invention is the inclusion inside decorative elements like the transom 68 and sleeve 72 (post 72) of metal parts having superior structural properties, without exposing the metal beams 12, 14, 16, and ties 20 to weather, or to public view. For this reason, caps 74 may be used for end treatments of various sleeve materials 64 as appropriate. Likewise, cuts can be made in various manners in order to provide complete coverage of the framing elements 12, 14, 16, 20.

Figure 12:
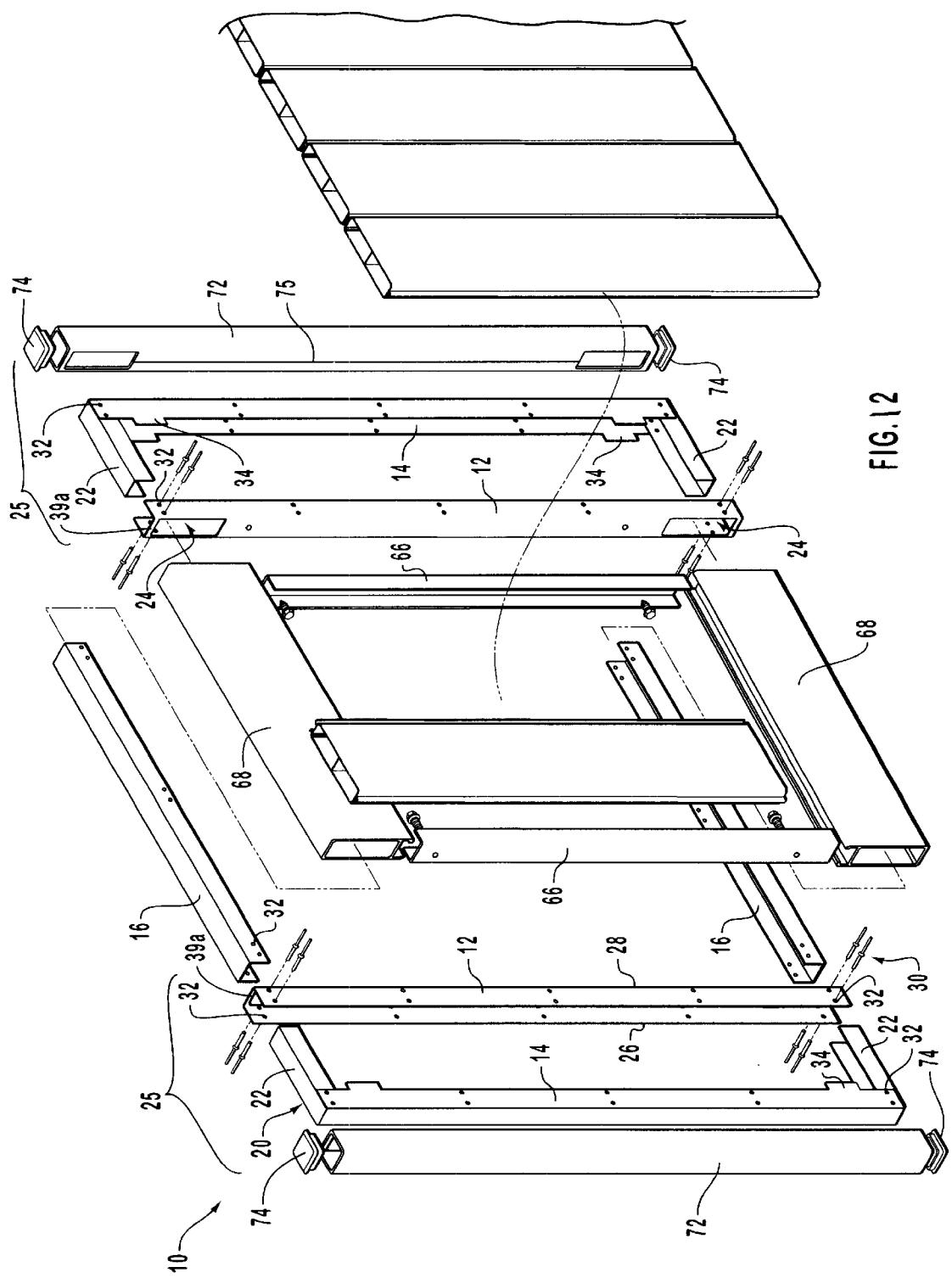
FIG. 12 is an exploded-perspective view of an alternative embodiment of a gate frame structure using integrated, folded-corner type ties as part of the vertical beam, and illustrating vinyl fencing assemblies sheathing the gate frame structure.

Referring to FIG. 12, an embodiment of an aperture 24 may be adapted to fit both a tab 34 and a cross leg 22 through a single aperture 24. One disconcerting result of the tabs 34 is the requirement of a slit 75 in the sleeve 72 in order to slide the beam 14 through the sleeve 72. Since the cross legs 22 may be formed integrally with the beams 14, from the same piece of stock, and bent into shape and location, the beams 14 may slide through the sleeve 72 without a slit 75, when the tabs 34 are deleted.

Thus, certain embodiments do not have the tabs 34. Absent the tabs 34, the cross legs 22 may be bent into position after sliding the beam 14 into the beam 12, and inserting both into the sleeve 72. In this regard, the slit 75 need only extend along an end required to cover a connector 39a. Thus, absent the connection 39a, the apertures 24 may be formed as three-sided openings, open at the ends to facilitate bending of the cross legs 22 into final position, after sleeving the beams 12, 14 together as a beam assembly 25 into the sleeve 72.

By the same token, the tie 20 of FIGS. 2–4 may be installed by simple insertion into the ends of the combined beam assemblies 25 after sleeving, with the proper removal of material from the sleeves 72 and transoms 68 as required to provide proper decorative or aesthetic coverage thereof.

Figure 13:
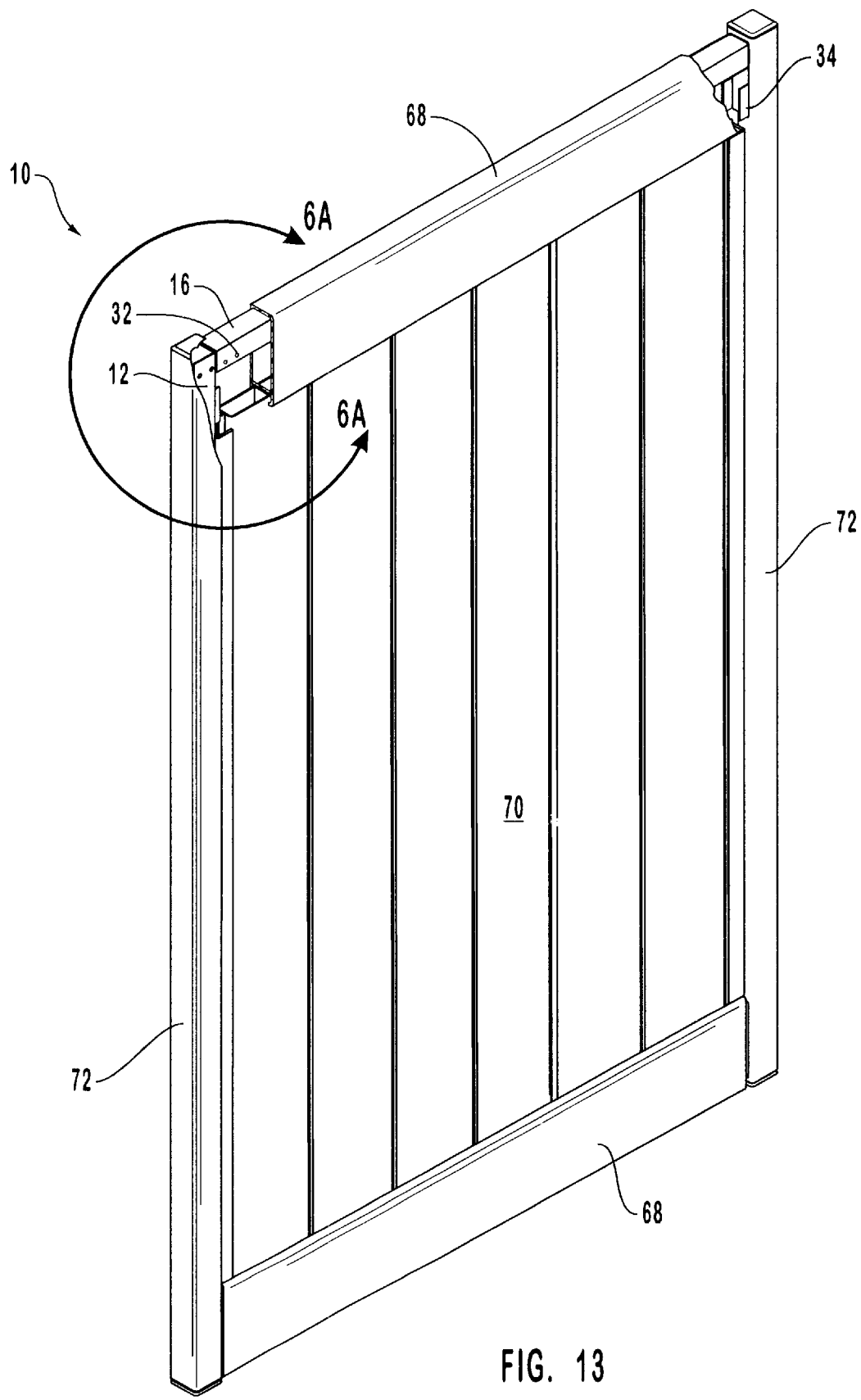
FIG. 13 is a partially cutaway, perspective view of an assembled gate relying on an internal sheet-metal-based gate frame in accordance with the invention.
Figure 14:
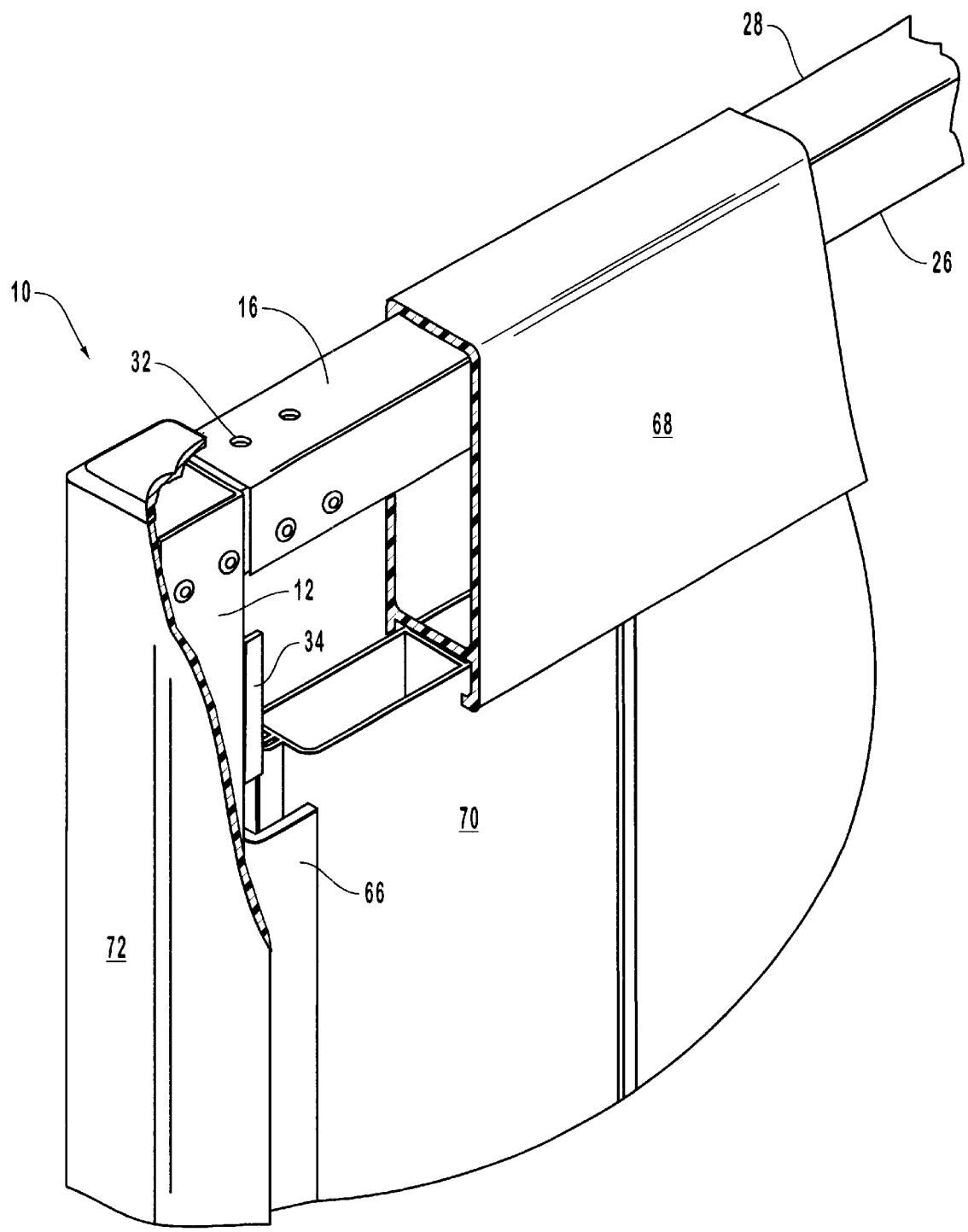
FIG. 14 is a partially cutaway perspective view of the detail of a corner of the apparatus of FIG. 13.

Referring to FIGS. 13–14, an assembled apparatus 10 illustrates the permanent positions of cross beams 16 and upright beams 12 illustrated with the optional tabs 34.

Figure 15:
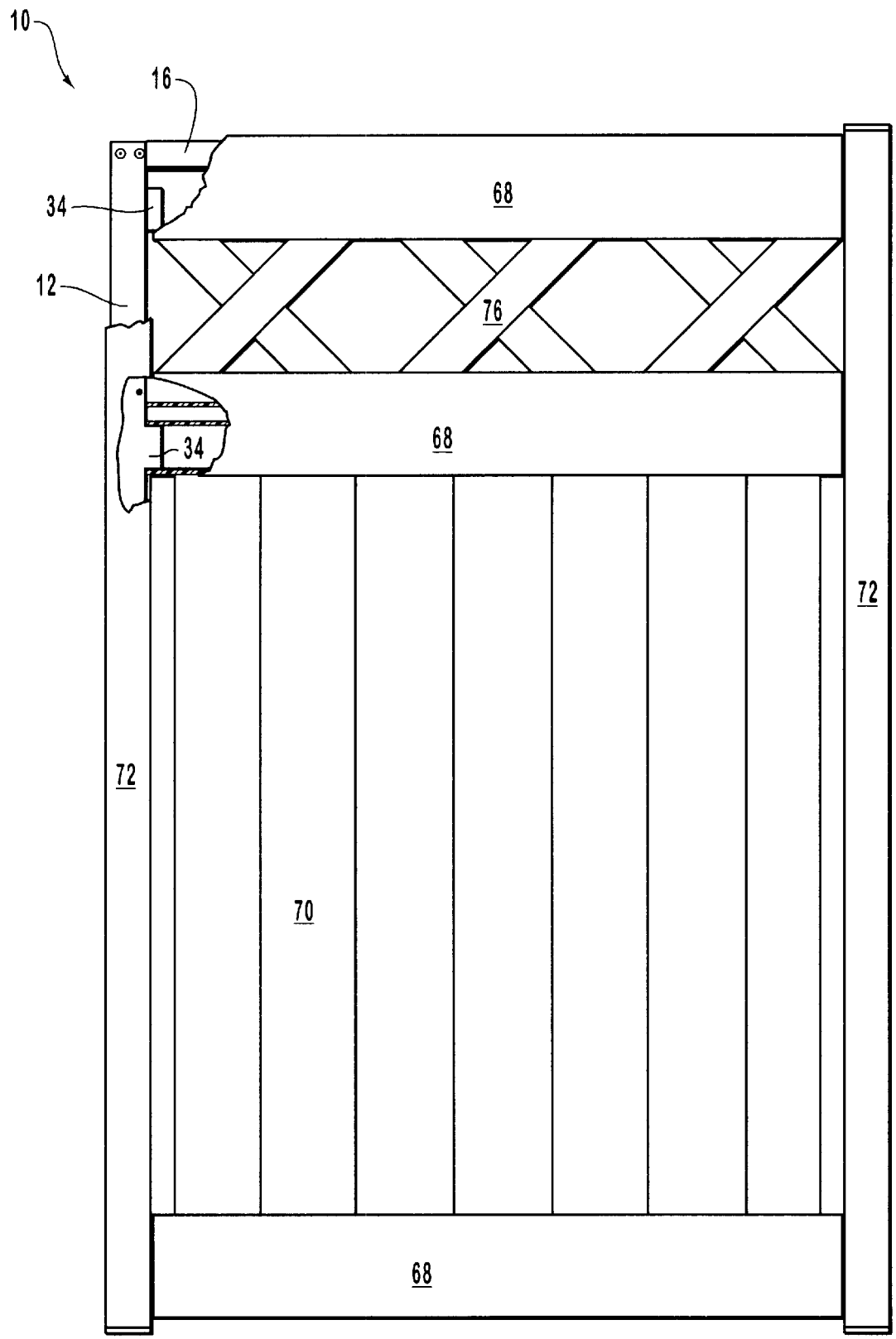
FIG. 15 is a partially cutaway, front, elevation view of an alternative embodiment of a vinyl-sheathed gate relying on an internal gate frame structure in accordance with the invention, this one having optional registration tabs or registers for stabilizing vinyl cross members.

Referring to FIG. 15, multiple transoms 68 may be installed in order to accommodate privacy slats 70, while also accommodating a lattice 76 therebetween. In the embodiment of FIG. 15, the tabs 34 may be more advantageous for the lower transom 68. However, the same functionality may be provided by adding proper apertures 34 and ties 20 to accommodate an additional cross beam 16 supporting the transom 68. However, to the extent that the apparatus 10 is primarily in place to provide overall structural integrity, and may do so with a single frame, a tie 20 may be used to support the transom 68 with no cross beam 16 assembled thereon.

Figure 16:
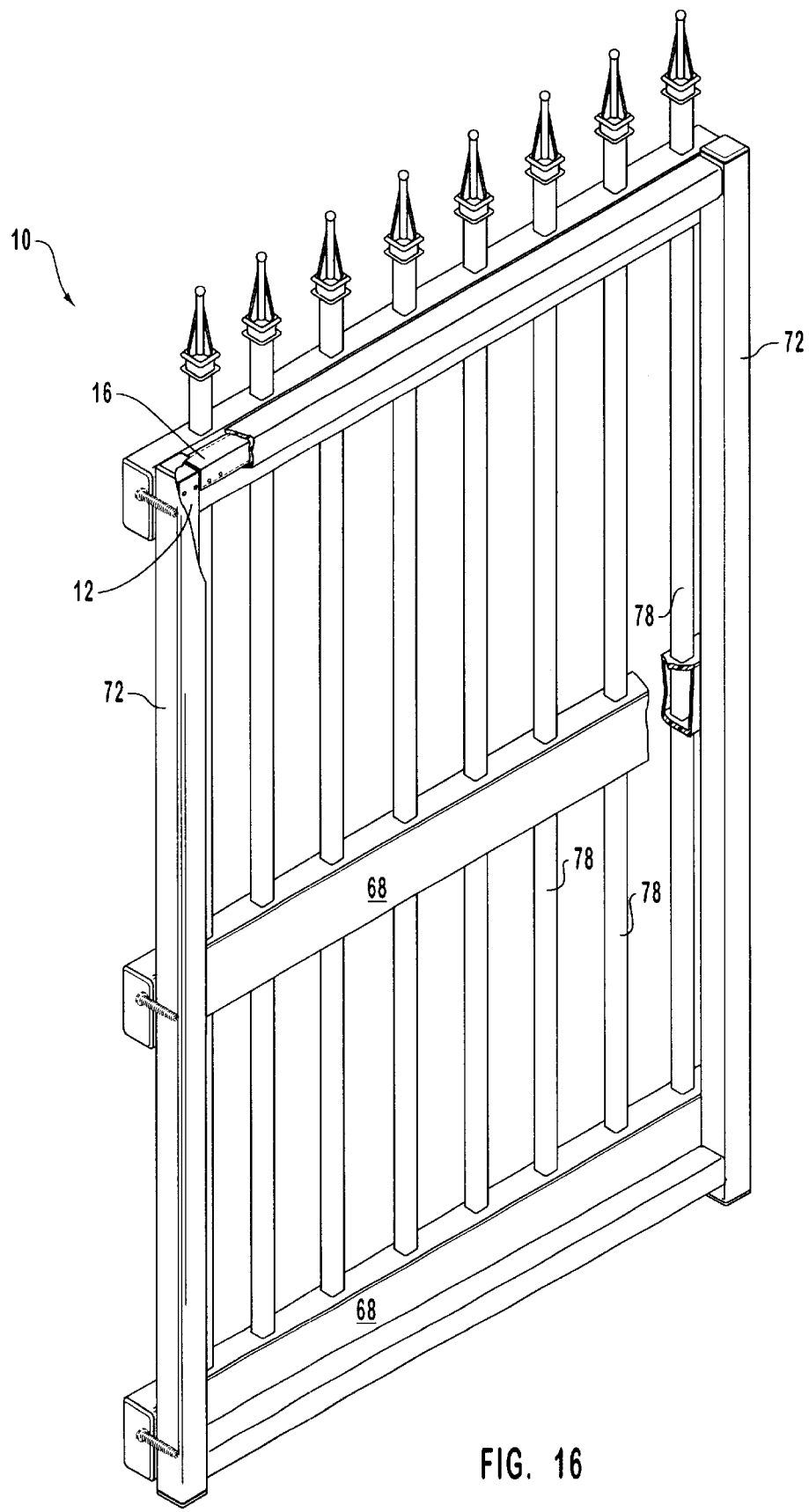
FIG. 16 is a partially cutaway, perspective view of an alternative embodiment of a sheathed gate, illustrating pickets and cross members (transoms) mounted eccentrically, shifted transversely toward one side of a sheathed gate frame, in accordance with the invention.

Referring to FIG. 16, an apparatus 10 may be installed using the beams 12, 14, 16 in any of the embodiments hereinabove described, sleeving each with a sleeve 72. In order to accommodate pickets 78, transoms 68 may be offset so as to fasten to the beams 12, and corresponding sleeves 72, rather than fitting between the beams 12.

Figure 17:
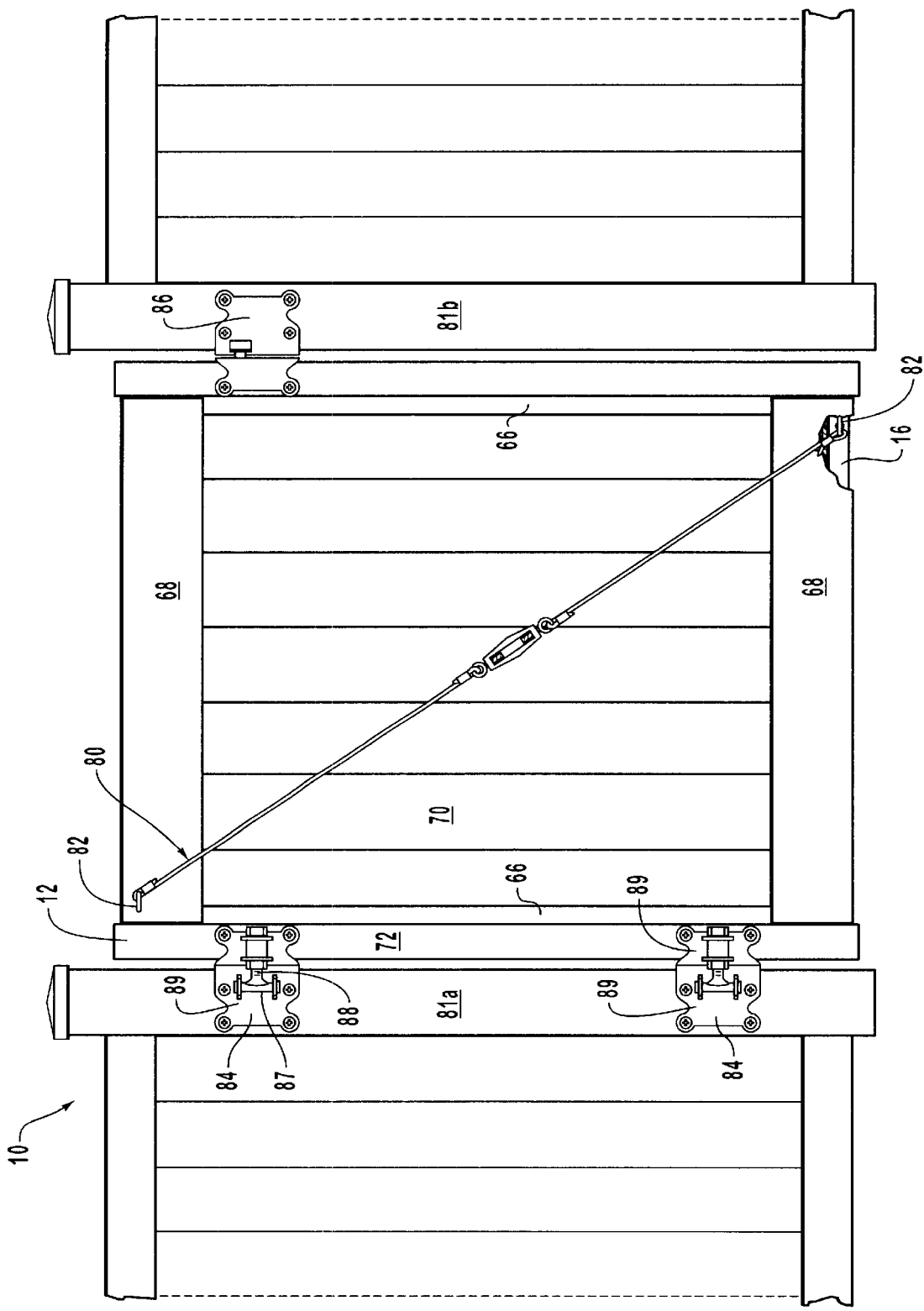
FIG. 17 is a partially cutaway, rear, elevation view of a sheathed gate having an internal gate frame in accordance with the invention.
Figure 18:
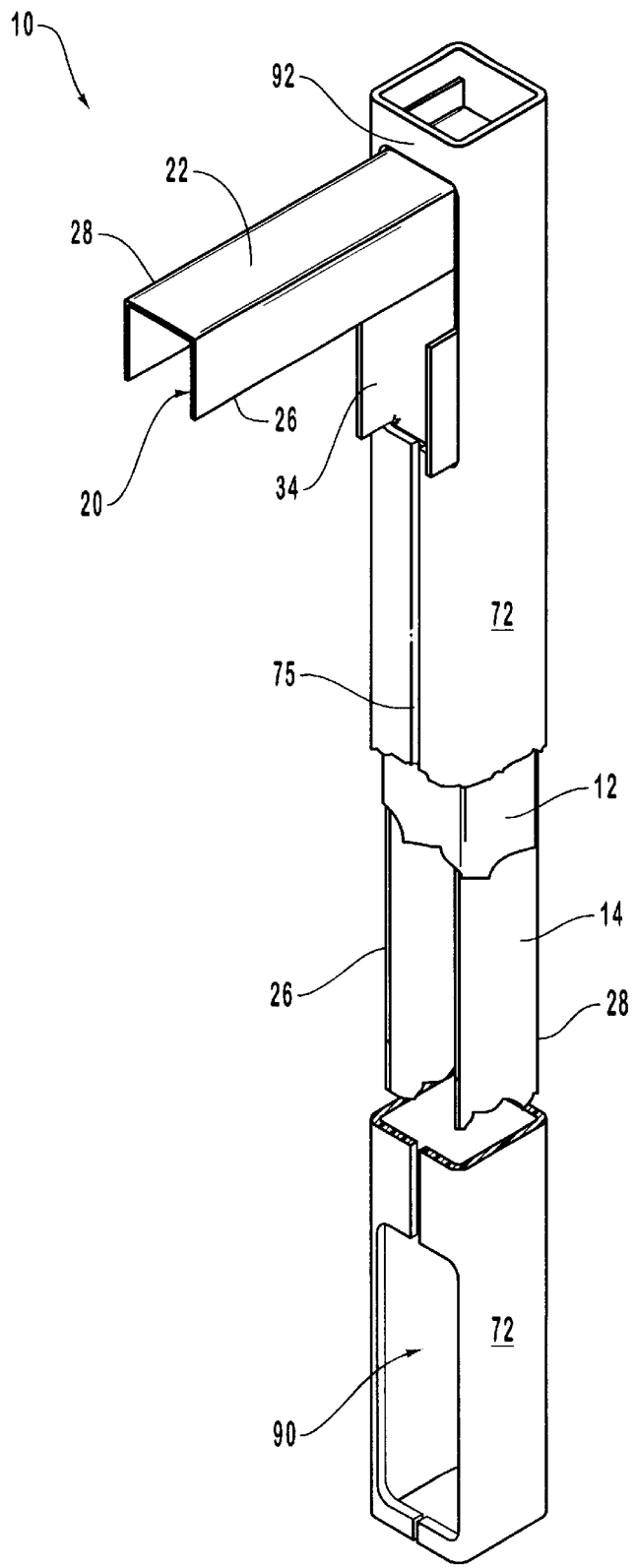
FIG. 18 is a partially cutaway, perspective view of a portion of a vertical beam, sheath, and corner tie in accordance one embodiment of the invention.

Referring to FIG. 17, an apparatus 10 may be installed having a support 80 connected to anchors 82 secured to beams 12, 14, 16, 25, or the like, as appropriate, in order to provide triangulation and vertical support of the extended weight positioned away from supporting hinges 84. That is, when a latch 86 is opened, and sometimes even when a latch 86 is operably engaged, the portion of an apparatus 10 (e.g. gate 10, gate frame 10) farthest from the hinges 84 is often cantilevered. Thus, additional support for maintaining the shape and structural integrity of the apparatus 10 may be required. Accordingly, the hinges 84 equipped with axles 87 and swing arms 88 secured to plates 89 may fasten to a post 81a anchored for supporting the weight of the apparatus 10.

Figure 19:
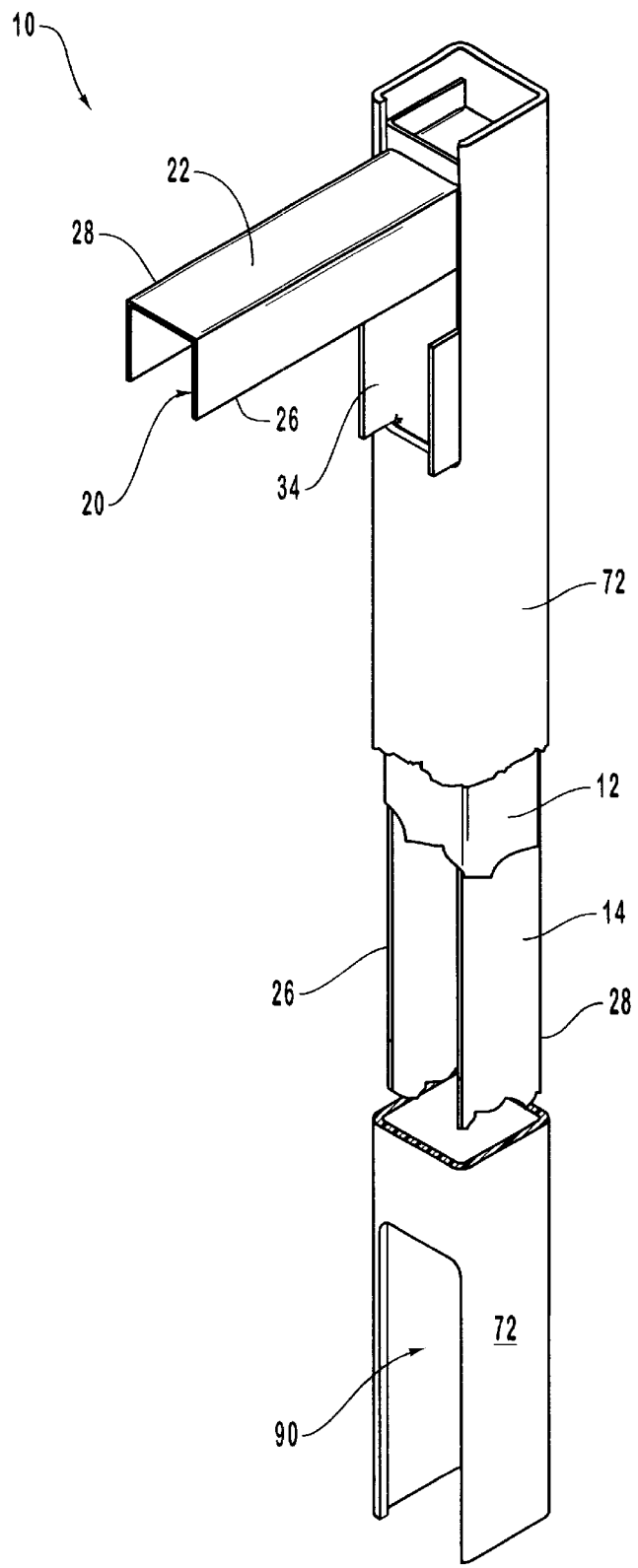
FIG. 19 is a partially cutaway, perspective view of a portion of a vertical beam, sheath, and corner tie in accordance with an alternative embodiment of the invention.
Figure 20:
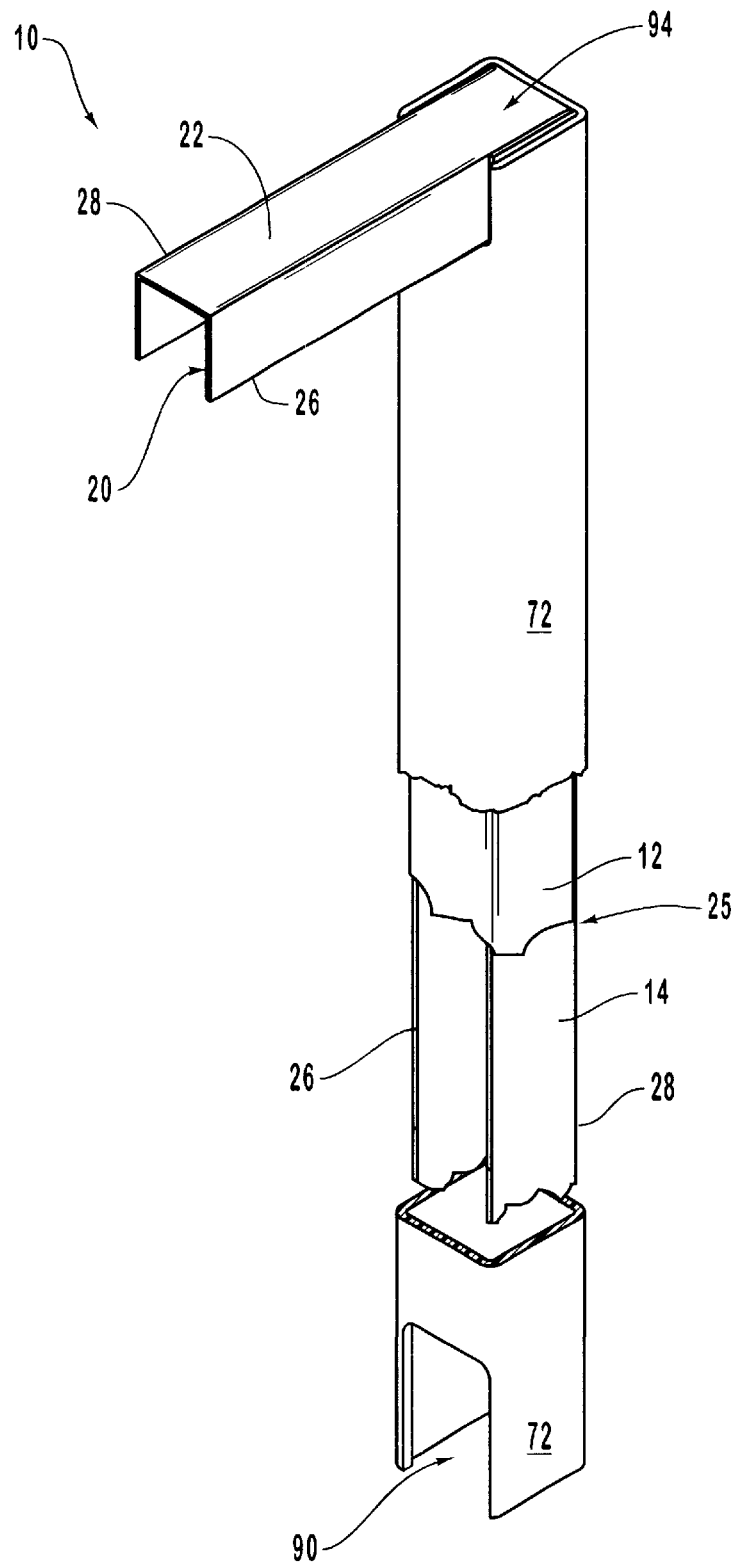
FIG. 20 is a partially cutaway, perspective view of a portion of a vertical beam, sheath, and corner tie in accordance with an alternative embodiment of the invention.

Referring to FIGS. 18–21, while continuing to refer generally to FIGS. 1–23, apertures 90 in the sleeve 72 along with the slit 75 may serve to accommodate the presence of optional tabs 34 for registering the ends of a transom 68. In the embodiment illustrated, the connector 92 may close the aperture 90 at one end of the sleeve 72. That is, the connection 92 or connector 92 may close the perimeter of the aperture 90, at one end of the sleeve 72. Alternatively, the transom may be cut to accommodate coverage of an open aperture 90 as illustrated in FIG. 19. Referring to FIG. 20, any of the ties 20 may be fitted to a beam 12, regardless of cross section, almost, and whether or not combined with an additional beam 14, if the aperture 90 is of an open-perimeter type as illustrated.

Thus, the tie 20 of FIGS. 2–4, assembled in halves 58, 60 may be fitted into the end of the beam assembly 25, beam 12, 14, or whatever structure may be relied upon inside the sleeve 72. The sleeve 72 does not require a slit 75 in order to be fully assembled. Likewise, since fasteners 30 may be inserted through the sleeve 72 as well as into the tie 20 and beams 12, 14, 16, the transom may completely enclose all evidence of the cross leg 22 or other portions of the tie 20. Alternatively, in FIG. 21, a cap 74 may cover the top 94 of the assembly 10 illustrated in FIG. 20.

Figure 21:
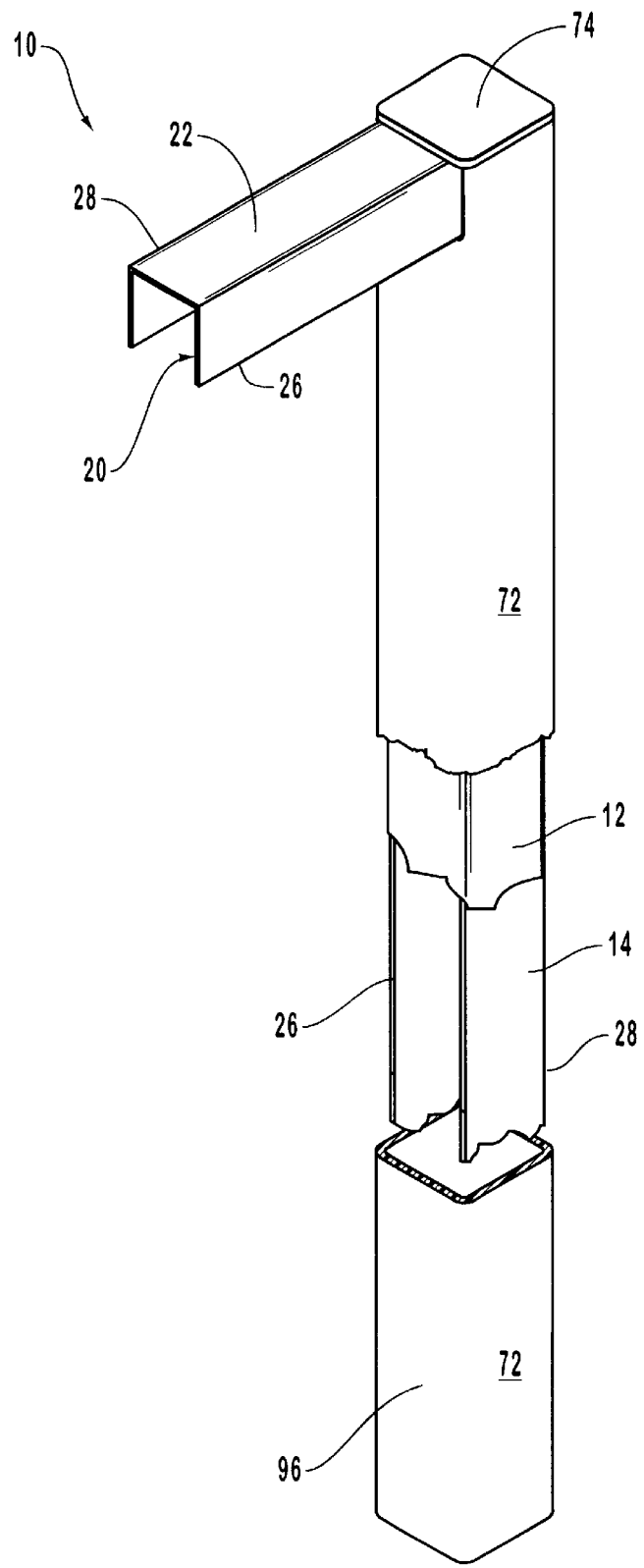
FIG. 21 is a partially cutaway, perspective view of a portion of a vertical beam, sheath, and corner tie in accordance one embodiment of the invention.

In an alternative embodiment, also illustrated in FIG. 21, the sleeve 72 may have an entirely closed-perimeter end 96 that requires no apertures 90 orthogonal to the access of the principal cross section. That is, an open end of a tube, need not have any augmentation by apertures orthogonal to the main cavity or the access along the length of the sleeve 72. Accordingly, materials may be shipped as straight lengths of stock, and assembled as corners, ties 20, beams 12, 14, 16, and the like, all on site. Thus, the bulk of gate hardware for frame support of gate materials such as plastics including vinyl, may reduce costs and improve convenience, without loss of structural properties.

Figure 22:
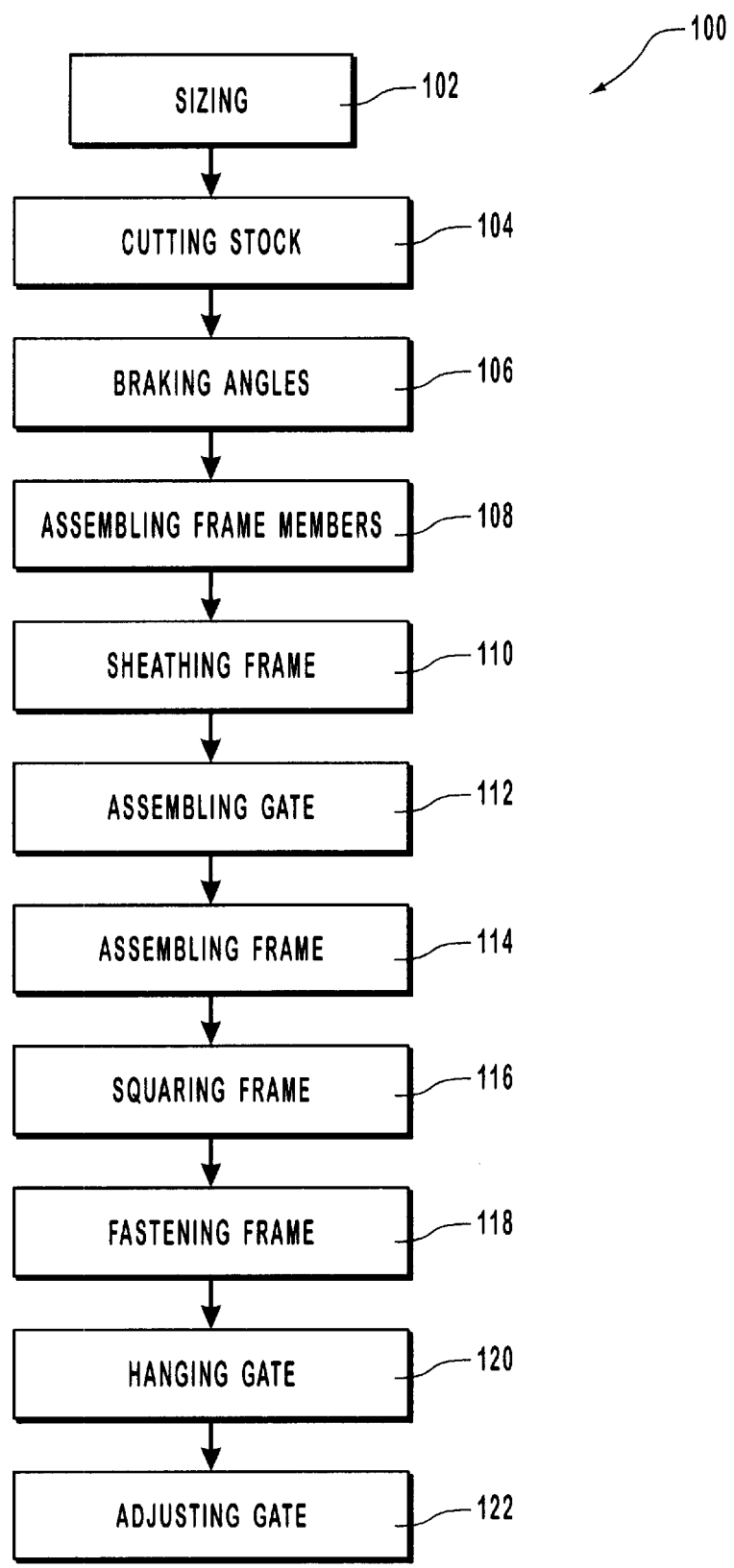
FIG. 22 is a schematic block diagram of a method for implementing a sheet-metal, internal, assembled, gate frame in accordance with the invention.
Figure 23:
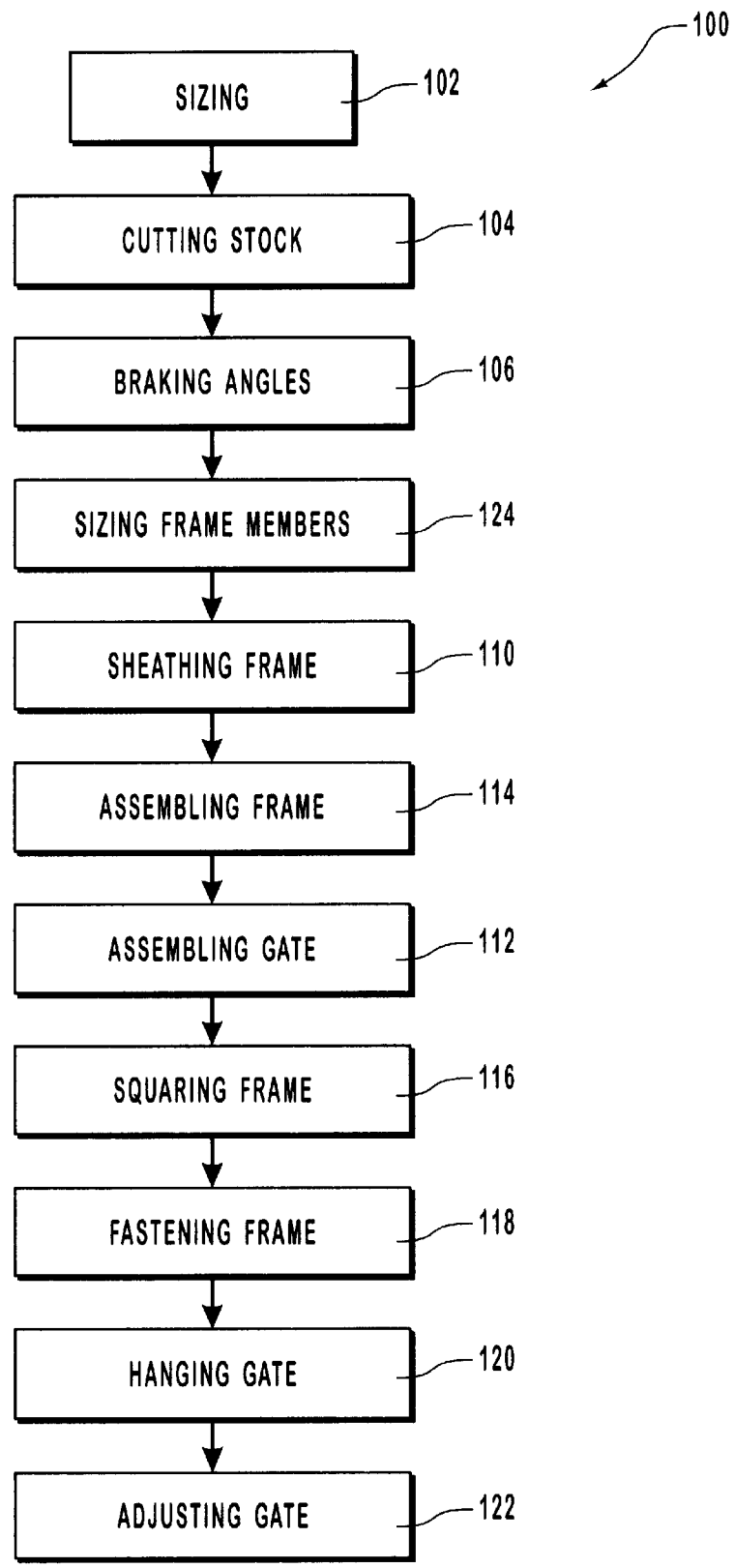
FIG. 23 is a schematic block diagram of an alternative embodiment of a method for implementing a sheet-metal, internal, assembled, gate frame in accordance with the invention.

Referring to FIGS. 22–23, a process 100 is identified for supporting a gate lacking sufficient inherent structural capacity in the privacy or decorative members thereof. An initial step 102 may include sizing materials. Sizing 102 may occur at a factory. However, in certain embodiments, disclosed above, just a part of sizing may be performed in a factory, such as diameters, widths, clearances, and the like. However, certain lengths may be sized either in a factory or on site. Cutting stock 104 may also occur in a factory, but may be continued on a site, in certain embodiments. Assembling 108 frame members may include partial or complete assembly.

Braking 106 the angles in particular beams 12, 14, 16, or in the ties 20, may be done by various means known in the art. Assembling the frame members 108 and sheathing 110 various frame members may require alternative process steps, and sometimes interleaved or alternating steps. That is, certain frame members 108 may be assembled prior to sheathing but may be finally assembled after sheathing. Depending on factors such as the particular embodiment of framing members 12, 14, 16, whether or not halves 34 exist, and the like, and depending, as well, on the types of ties 20, sheathing materials 64 may be slit 75, or not. Such factors will determine the order, amount, and so forth, of the assembling 108 and sheathing 110 steps.

Assembling 112 an apparatus 10 may also be interleaved with assembling 108 of frame members and assembling 114 the frame. Assembling 114 the apparatus 10 may embody final assembly of all corners. Thus, the steps 108–114 may be interleaved depending on a particular circumstance and the structural options exercised.

Squaring 116 the frame 10 may involve adjusting a support 80 to properly dimension and load the support 80 to carry the weight of the entire apparatus 10. Fastening 118 the frame may involve final securement of structural elements together. However, as a practical matter the frame system 10 must be fastened to support members such as hinges 84. Then the gate must typically be hung 120 to swing from a post 81. Some adjustment 122 may be ongoing. Initially, adjustment may be required, as squaring 116 is. Squaring 116 may typically involve squaring the necessary elements without regard to support, but only dimensional correctness. Fastening 118 may involve final securement of framed pieces in a secured position. In certain of the embodiments disclosed herein, a great degree of freedom is permitted, and various parts may be assembled in a substantially stable relationship, without the use of any fasteners 30.

Once the frame has been completely squared 116, then fasteners 30 may be installed 118. Hanging 120 may involve attachment of hinges, and securement of hinges to both the gate frame 10 and a supporting post 81. Adjustment 122 may involve adjustment of the supporting element 80 that secures squareness and vertical support.

Referring to FIG. 23, sizing 102, cutting stock 104, and braking angles 106 may be followed by additional sizing 124 of frame members. That is, stock may be cut 104 at a factory, with the intention that sizing 124 is to occur on site. Similarly, assembling 114 a frame, may follow sheathing 110 entirely, or substantially so. Assembling the gate 112 may actually be interleaved with assembling the frame 114, as discussed above. Squaring 116 and fastening 118 may occur as described above, as may hanging 120 and adjusting 122 the apparatus 10.

From the above discussion, it will be appreciated that the present invention provides an apparatus for internally framing a vinyl gate suitable for use with vinyl fencing and provides completely hidden structures formed of sheet metal and assembled for greater strength and rigidity. Beams may be formed as channels from sheet metal, which may be placed together, with open edges of the channel juxtaposed and positioned within each other, in order to provide fully closed perimeters for beams. Various types of corner ties are provided to support loads and squareness required between vertical and horizontal members of the frame. In various embodiments, vinyl sleeves may be placed over various beams before or after the beams have been filly assembled, as appropriate, possible, or required. In certain embodiments, the entire systems of gate framing may be shipped in a long format appearing primarily as linearly-extending, channel-shaped stock. Likewise sheathing can ship as long stock. All fastening may be done after assembly, in order to finalize squareness and position prior to permanent application of fasteners.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An apparatus comprising:
   a tie comprising an open channel member having longitudinal, lateral, and transverse directions substantially orthogonal to one another;
   longitudinal members oriented longitudinally;
   lateral members oriented laterally and being separably distinct from the tie and the longitudinal members;

a fixing member to fix a longitudinal member of the longitudinal members with respect to the tie;

a fastener formed to secure a lateral member of the lateral members to the tie;

a sheathing member having a closed perimeter to fit over the longitudinal member; and the tie, further configured to fix the longitudinal member and the lateral member substantially rigidly at a selected angle with respect to one another.

2. The apparatus of claim 1, wherein the tie is configured to bend between a manufactured position and an installed position.

3. The apparatus of claim 1, wherein the tie is configured to remain rigid during and after installation.

4. The apparatus of claim 1, wherein the tie is formed to have a lateral leg and a longitudinal leg extending in fixed relation to one another.

5. The apparatus of claim 1, wherein the tie is formed in two halves forming mirror images of one another.

6. The apparatus of claim 1, wherein the tie is formed in two halves forming mirror images of one another and configured to fit in abutting relation to one another inside the longitudinal member.

7. The apparatus of claim 6, wherein the longitudinal member is configured to position the two halves with respect to one another.

8. The apparatus of claim 7, further comprising fasteners configured to fix the tie with respect to the longitudinal member.

9. The apparatus of claim 1, wherein the tie, the longitudinal member, and the lateral member are formed of sheet material folded to increase a section modulus thereof.

10. The apparatus of claim 1, wherein the longitudinal member is formed of a pair of channels juxtaposed to form a tubular cross-section.

11. The apparatus of claim 1, wherein the lateral member, longitudinal member, and tie are formed of identical stock, and formed exclusively by cutting and bending.

12. The apparatus of claim 1, further comprising longitudinal sheathing members and lateral sheathing members, the lateral sheathing members extending between the longitudinal sheathing members and formed to obscure the lateral members and a portion of the tie, the remainder of the tie being secured to be obscured by at least one of the longitudinal member and a longitudinal sheathing member of the longitudinal sheathing members.

13. A kit comprising:

a lateral member;

a longitudinal member having a tie formed as a monolithic piece therewith;

the tie being formed to orient the lateral member and longitudinal member with respect to one another;

sheathing formed to have a closed cross section continuous about a selected perimeter thereof; and at least two of the lateral member, longitudinal member, and tie being configured to receive the selected perimeter of the sheathing therearound for decorative obscuration.

14. The kit of claim 13, further comprising another lateral member, another longitudinal member, and corresponding ties for forming a quadrilateral structure.

15. The kit of claim 14, further comprising panel materials configured to extend across the quadrilateral structures, and securement structures for securing the panel materials with respect to the quadrilateral structure.

16. A method comprising:

providing a first longitudinal beam;

providing a first lateral beam;

providing a first tie comprising an open channel member;

providing fasteners;

providing a sheathing material;

substantially covering the first longitudinal beam with the sheathing material;

substantially covering the first lateral beam with the sheathing material;

positioning the first tie to orient the first lateral beam with respect to the first longitudinal beam; and securing, with the fasteners, the first lateral beam, the first longitudinal beam, and the first tie in a fixed angular relation with respect to one another.

17. The method of claim 16, further comprising:

providing a second lateral beam, a second longitudinal beam, a second tie, and additional fasteners; and securing the first lateral beam, second lateral beam, first longitudinal beam, second longitudinal beam, first tie, and second tie in a sheathed quadrilateral frame.

18. The method of claim 17, further comprising squaring the first longitudinal beam with respect to the first lateral beam.

19. The method of claim 17, further comprising providing the first lateral beam, first longitudinal beam, and first tie from a stock of material of a single size.

20. The method of claim 19, wherein the stock is a single stock of sheet metal, and the single size is a thickness thereof.

* * * * *